(12) United States Patent  
Yoshihara et al.

(10) Patent No.: US 8,199,140 B2  
(45) Date of Patent: Jun. 12, 2012

(54) DISPLAY DEVICE

(75) Inventors: Toshiaki Yoshihara, Kawasaki (JP); Masaki Nose, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 326 days.

(21) Appl. No.: 12/568,154

(22) Filed: Sep. 28, 2009

(65) Prior Publication Data

US 2010/0013807 A1    Jan. 21, 2010

Related U.S. Application Data

(63) Continuation of application No. PCT/JP2007/000342, filed on Mar. 30, 2007.

(51) Int. Cl.
*G09G 5/00* (2006.01)

(52) U.S. Cl. ........... 345/204; 345/84; 345/214; 345/690

(58) Field of Classification Search ........................ None
See application file for complete search history.

(56) References Cited

U.S. PATENT DOCUMENTS

| | | | | |
|---|---|---|---|---|
| 5,815,286 | A * | 9/1998 | Matsuba et al. | 358/3.19 |
| 6,222,512 | B1 * | 4/2001 | Tajima et al. | 345/63 |
| 6,812,913 | B2 * | 11/2004 | Masazumi et al. | 345/94 |
| 2001/0038373 | A1 * | 11/2001 | Yamakawa et al. | 345/95 |
| 2005/0206596 | A1 * | 9/2005 | Chen et al. | 345/87 |
| 2006/0109236 | A1 | 5/2006 | Yamaguchi et al. | |
| 2008/0024412 | A1 | 1/2008 | Nose | |

FOREIGN PATENT DOCUMENTS

| | | | |
|---|---|---|---|
| JP | 2006-153903 A | 6/2006 | |
| WO | 2006/103738 A1 | 10/2006 | |

OTHER PUBLICATIONS

International Search Report for PCT/JP2007/000342, mailing date of May 29, 2007.
Notification of Reasons for Rejection issued Dec. 28, 2011 in corresponding Japanese Application No. 2009-508695 (partial translation).

* cited by examiner

*Primary Examiner* — Jason Olson
(74) *Attorney, Agent, or Firm* — Westerman, Hattori, Daniels & Adrian, LLP

(57) ABSTRACT

A display device has a display panel having a first substrate in which a plurality of first electrodes are disposed in parallel, a second substrate in which a plurality of second electrodes crossing the first electrodes are disposed in parallel, and a material layer which is disposed between the first and second substrates and reflects, transmits or absorbs light with a predetermined wavelength according to a write state;
first and second drive circuits which drive the first and second electrodes respectively; and a drive control circuit which performs drive control for the first and second drive circuits. When refreshing a display image, the first or second drive circuit, while applying a reset pulse to a plurality of adjacent electrode group of first or second electrodes, scans the electrode group so as to reset the pixels, and the drive control circuit controls to change the direction of scanning.

9 Claims, 20 Drawing Sheets

FIG.2  PRIOR ART
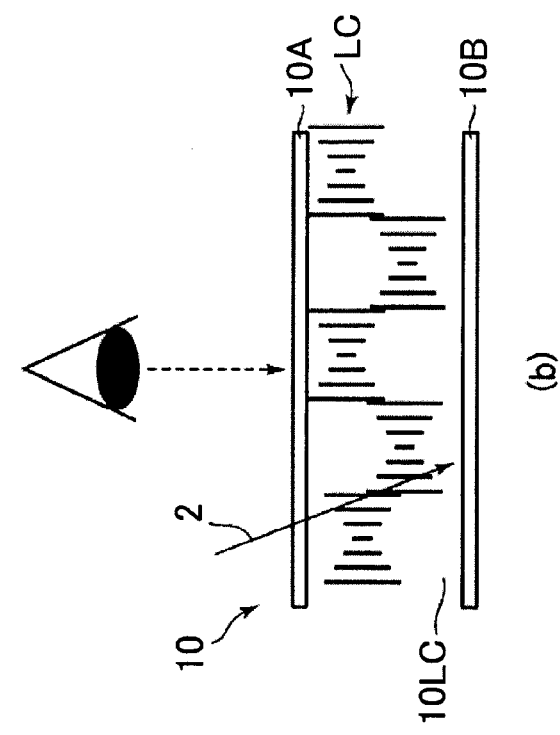
(a)
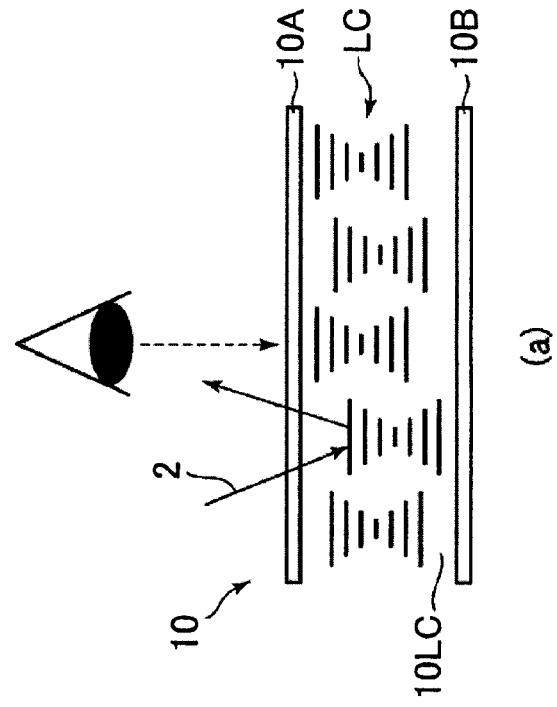
(b)

FIG.11A

| SCAN MODE | V0 | 32V |
| --- | --- | --- |
| | V21 | 28V |
| | V34 | 4V |
| | V5 | 0V |
| | GND | 0V |

FIG.11B

| DATA MODE | V0 | 32V |
| --- | --- | --- |
| | V21 | 24V |
| | V34 | 8V |
| | V5 | 0V |
| | GND | 0V |

FIG.12

|  | DATA SIGNAL | AC SIGNAL | DRIVER OUTPUT | VOLTAGE |
|---|---|---|---|---|
| DATA MODE | High | High | V0 | 32V |
| | | Low | V5 | 0V |
| | Low | High | V21 | 24V |
| | | Low | V34 | 8V |
| SCAN MODE | Select | High | V5 | 0V |
| | | Low | V0 | 32V |
| | Non-Select | High | V21 | 28V |
| | | Low | V34 | 4V |

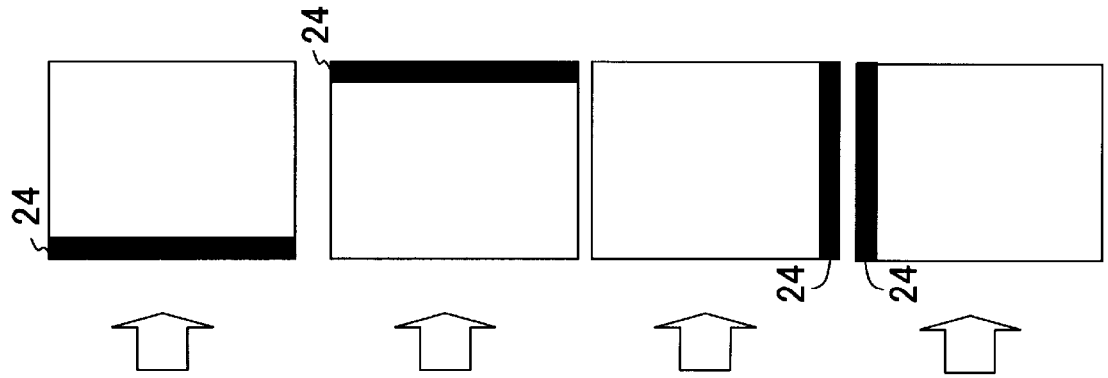
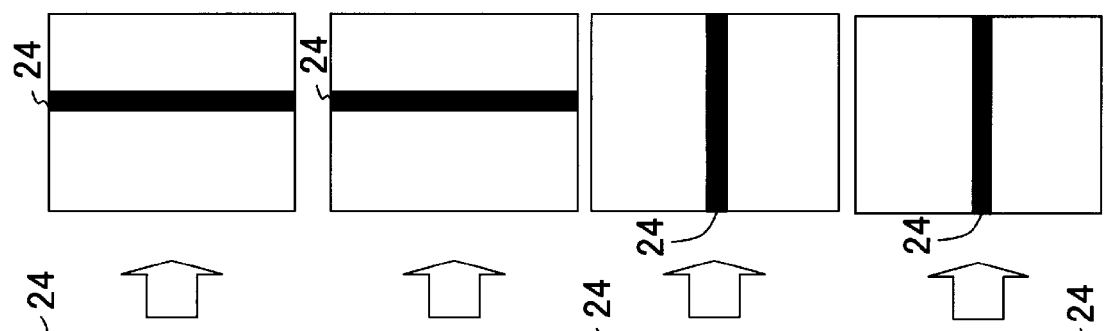
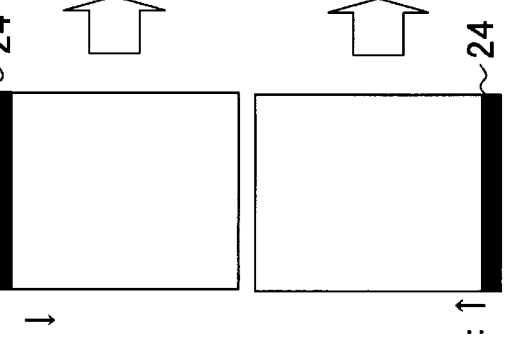
FIG19A FIG19B FIG19C FIG19D

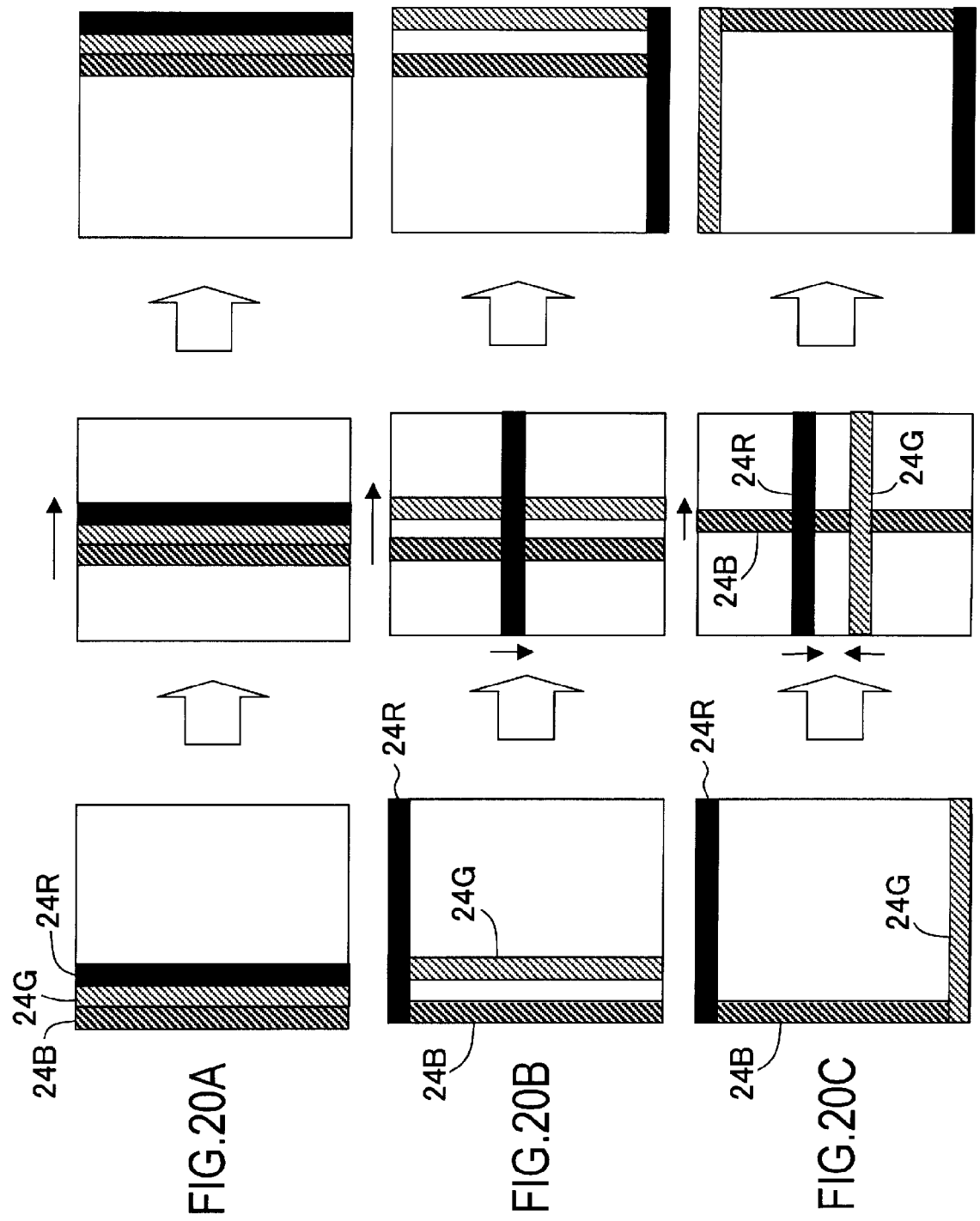

DISPLAY DEVICE

CROSS REFERENCE TO RELATED APPLICATION

This application is a continuation of International Application No. PCT/JP2007/000342, filed on Mar. 30, 2007, now pending, herein incorporated by reference.

FIELD

The present invention relates to a display device, and more particularly to a display device which is expected to be used as electronic paper.

BACKGROUND

Electronic paper is proposed to be applied to various portable equipment, such as electronic books, sub-display of mobile terminal equipment and display portion of IC cards. One promising display device for electronic paper is a display device using liquid crystal composition in which a cholesteric phase is formed (referred to as cholesteric liquid crystals or chiral nematic liquid crystals, which are generically referred to as cholesteric liquid crystals in the present description). Cholesteric liquid crystals have excellent characteristics, including a semi-permanent display holding characteristic (memory characteristic), clear color display characteristic, high contrast characteristic and high resolution characteristic.

FIG. 1 is a diagram depicting a cross-sectional configuration of a liquid crystal display device using cholesteric liquid crystals that can display full color. The liquid crystal display device 1 has a blue display portion 10, green display portion 11 and red display portion 12, which are layered sequentially from the display surface at the user 3 side. The upper substrate side in FIG. 1 is a display surface, and external light 2 enters from the area above the substrate to the display surface.

The blue display portion 10 has blue liquid crystals 10LC sealed between a pair of top and bottom substrates 10A and 10B, and a pulse voltage supply 10P which applies a predetermined pulse voltage to the blue liquid crystal layer 10LC. The green display portion 11 has green liquid crystals 11LC sealed between a pair of top and bottom substrates 11A and 11B, and a pulse voltage supply 11P which applies a predetermined pulse voltage to the green liquid crystal layer 11LC. The red display portion 12 has red liquid crystals 12LC sealed between a pair of top and bottom substrates 12A and 12B, and a pulse voltage supply 12P which applies a predetermined pulse voltage to the red liquid crystal layer 12LC. A light absorption layer 13 is disposed on the back surface of the bottom substrate 12B of the red display portion 12.

The cholesteric liquid crystals used for each blue, green and red liquid crystal layer 10LC, 11LC and 12LC, are a crystal mixture in which a relatively large amount of chiral additives (also called chiral material) is added to nematic liquid crystals at several tens wt % of percentage content. If a relatively large amount of chiral material is contained in the nematic liquid crystals, the cholesteric phase, in which nematic liquid crystal molecules are strongly twisted in spirals, can be formed. Consequently the cholesteric liquid crystals are also called chiral nematic liquid crystals.

Cholesteric liquid crystals have a bi-stable characteristic (memory characteristic) and can be in a planar state (reflection state), focal conic state (transmission state) or an intermediate mixed state thereof by adjusting electric field strength to be applied to the liquid crystals. Once the cholesteric liquid crystals enter the planar state, focal conic state or intermediate mixed state thereof, the state is stably held even if the electric field disappears thereafter.

The planar state is generated, for example, by applying a strong electric field to the liquid crystal layer by applying a predetermined high voltage between the top and bottom electrodes, so that the liquid crystals becomes a homeotropic state, then rapidly decreasing the electric field to zero. The focal conic state is generated, for example, by applying a predetermined voltage which is lower than the above mentioned high voltage between the top and bottom substrates, so as to apply an electric field to the liquid crystal layer, then rapidly decreasing the electric field to zero. The focal conic state can also be generated by gradually applying voltage from the planar state. The intermediate state between the planar state and the focal conic state is generated, for example, by applying a voltage lower than the voltage for generating the focal conic state, between the top and bottom substrates, so as to apply an electric field to the liquid crystal layer, then rapidly decreasing the electric field to zero.

FIG. 2A and FIG. 2B are diagrams depicting the display principle of a liquid crystal display device using cholesteric liquid crystals. In FIG. 2A and FIG. 2B, the blue display portion is described as an example. FIG. 2A depicts the orientation state of liquid crystal molecules LC of the cholesteric liquid crystals when the blue liquid crystal layer 10LC of the blue display portion 10 is in the planar state. As FIG. 2A depicts, the liquid crystal molecules LC in the planar state sequentially rotate in the substrate thickness direction and form a spiral structure, and the spiral axis of the spiral structure is roughly vertical to the substrate surface.

In the planar state, lights having a predetermined wavelength, according to the spiral pitch of the liquid crystal molecules, are selectively reflected by the liquid crystal layer. If an average refractive index of the liquid crystal layer is n and the spiral pitch is p, the wavelength $\lambda$ with which the reflection is the maximum is given by $\lambda = n \cdot p$. Therefore if the average refractive index n and the spiral pitch p are determined so that $\lambda = 480$ nm is established, for example, then the blue liquid crystal layer 10LC of the blue display portion 10 selectively reflects the blue lights in the planar state. The average refractive index n can be adjusted by selecting the liquid crystal material and chiral material, and the spiral pitch p can be adjusted by adjusting the percentage content of the chiral material.

FIG. 2B depicts the orientation state of the liquid crystal molecules of the cholesteric liquid crystals when the blue liquid crystal layer LC of the blue display portion 10 is in the focal conic state. As FIG. 2B depicts, the liquid crystal molecules in the focal conic state sequentially rotate in the substrate plane direction and forms a spiral structure, and the spiral axis of the spiral structure is roughly parallel with the substrate surface. In the focal conic state, the blue liquid crystal layer 10LC loses the ability to select the reflection wavelength, and most of the incident lights 2 transmit. Since the transmitted lights are absorbed by the light absorption layer 13 disposed on the back surface of the bottom substrate 12B of the red display unit 12, the screen becomes a dark (black) display.

In the intermediate state between the planar state and focal conic state, the ratio of the reflected light and transmitted light can be adjusted according to the state, so the intensity of the reflected light can be changed. Thus in the case of the cholesteric liquid crystals, reflected light quantity can be controlled by the orientation state of the liquid crystal molecules twisted into a spiral.

If cholesteric liquid crystals, which selectively reflect green or red light in the planar state, are sealed in the green liquid crystal layer and red liquid crystal layer respectively, just like the above mentioned case of the blue liquid crystal layer, a full color liquid crystal display device can be implemented.

By layering liquid crystal display panels, which selectively reflect red, green and blue light using cholesteric liquid crystals like this, a full color display device which has the memory characteristic can be implemented, and a color display with zero power consumption becomes possible, except for when the screen is refreshed.

In the case of a display device utilizing the selective reflection of cholesteric liquid crystals, however, it is necessary to temporarily reset the liquid crystals to the homeotropic state with high voltage when the display image is changed. This means that high power is required during reset. This high power required during reset is a major problem for portable equipment, of which the instantaneous capacity of a battery is limited.

A display refreshing method to solve this problem is disclosed in the following WO06/103738 (2006.10.05 International Publication). According to this display refreshing method of Patent Document, reset driving is executed by simultaneously selecting a plurality of scan electrodes, and a group of a plurality of scan electrodes being selected is scanned. Since reset driving is limited to part of the scan electrode group on screen, instantaneous power can be suppressed. Also reset driving is performed to the plurality of scan electrodes simultaneously, so the time to reset one screen can be decreased.

FIG. 3 depicts a problem of a conventional display refreshing method. In the display state depicted in FIG. 3, the English language display screen "A B C D . . . " 20 is gradually changed to the Japanese language display screen "a i u e o . . . in Japanese" 21, 22, 23. According to the display refreshing method of WO06/103738 (2006.10.05 International Publication), a plurality of scan electrodes are simultaneously selected and driven for reset, and the selected scan electrode group is scanned. Therefore the user can recognize the state where a strip area 24 being reset (or being reset and written) moves in the scan direction.

This strip area 24 is in a homeotropic state, and this homeotropic state, which is transparent, is recognized as a strip in a color of the light absorption layer 13, normally black, by the user. Time when the strip area 24 is recognized depends on the number of lines of the scan electrode, but is time required for resetting all the pixels and is approximately several seconds to several tens of seconds. Since the display of this strip area 24 is irritating to a user, decreasing this irritation is demanded.

Also it takes about several seconds to several tens of seconds to refresh the display image that includes reset, so the image is always refreshed in the same scan direction whether the image data direction is written vertically or horizontally, which also is irritating to the user.

SUMMARY

According to an aspect of an embodiment, a display device, includes:
a display panel having a first substrate in which a plurality of first electrodes are disposed in parallel, a second substrate in which a plurality of second electrodes crossing the first electrodes so as to form pixels are disposed in parallel, and a material layer which is disposed between the first and second substrates and reflects, transmits or absorbs light with a predetermined wavelength according to a write state;
first and second drive circuits which drive the first and second electrodes respectively; and
a drive control circuit which performs drive control for the first and second drive circuits,
wherein when refreshing a display image, the first or second drive circuit, while applying a reset pulse to a plurality of adjacent electrode group of first or second electrodes, scans the electrode group so as to reset the pixels in the electrode group, and
the drive control circuit controls to change the direction of scanning of the electrode group performed by the first or second drive circuit.

According to another aspect of an embodiment, a display device, includes:
a display panel having a first substrate in which a plurality of first electrodes are disposed in parallel, a second substrate in which a plurality of second electrodes crossing the first electrodes so as to form pixels are disposed in parallel, and a material layer which is disposed between the first and second substrates and reflects or transmits light with a predetermined wavelength according to a write state;
first and second drive circuits which drive the first and second electrodes respectively; and
a drive control circuit which performs drive control for the first and second drive circuits,
wherein when refreshing a display image, the first or second drive circuit, while applying a reset pulse to a plurality of adjacent electrode group of first or second electrodes, scans the electrode group so as to reset the pixels in the electrode group,
a plurality of the display panels for which the lights with predetermined wavelengths are all different are layered, and the reflective layer is disposed on the second substrate side of the lowest panel of the plurality of display panels, and
the drive control circuits of the plurality of display panels control the first or second drive circuit, so that the scan direction of the electrode group in the first display panel and the scan direction of the electrode group in the second display panel are different.

According to another aspect of an embodiment, a display device, includes:
a display panel having a first substrate in which a plurality of first electrodes are disposed in parallel, a second substrate in which a plurality of second electrodes crossing the first electrodes so as to form pixels are disposed in parallel, and a material layer which is disposed between the first and second substrates and reflects or transmits light with a predetermined wavelength according to a write state;
first and second drive circuits which drive the first and second electrodes respectively; and
a drive control circuit which performs drive control for the first and second drive circuits,
wherein when refreshing a display image, the first or second drive circuit, while applying a reset pulse to a plurality of adjacent electrode group of first or second electrodes, scans the electrode group so as to reset the pixels in the plurality of electrode groups,
a plurality of the display panels for which the lights with predetermined wavelengths are all different are layered, and the reflective layer is disposed on the second substrate side of the lowest panel of the plurality of display panels, and
the drive control circuits of the plurality of display panels control the first or second drive circuit, so that the scan timing of the electrode group in the first display panel and the scan timing of the electrode group in the second display panel are different.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 2A and FIG. 2B are diagrams depicting the display principle of an exemplary liquid crystal display device using cholesteric liquid crystals;

FIG. 11A and FIG. 11B depict the relationship of the input voltage terminals of the drive circuits 30 and 31 and the input voltage in scan mode and data mode.

FIG. 12 depicts the voltage values of pulse signals in the drive circuits 30 and 31 in the scan mode and data mode.

FIG. 19A to FIG. 19D depict another scan mode examples of the write method according to the present embodiment.

FIG. 20A to FIG. 20C depict another scan mode examples of the write method according to the present embodiment.

DESCRIPTION OF EMBODIMENTS

Embodiments will now be described with reference to the drawings. The technical scope of the present invention, however, is not limited to these embodiments, but extend to the content of the Claims and equivalents thereof.

The embodiment can be applied to a display device using not only cholesteric liquid crystal materials, but also similar display devices utilizing electronic powder and granular materials and electrophoresis. A liquid crystal display device and electronic paper using blue (B), green (G) and red (R) cholesteric liquid crystals will be described herein below, as an example of a display device.

Figure 1:
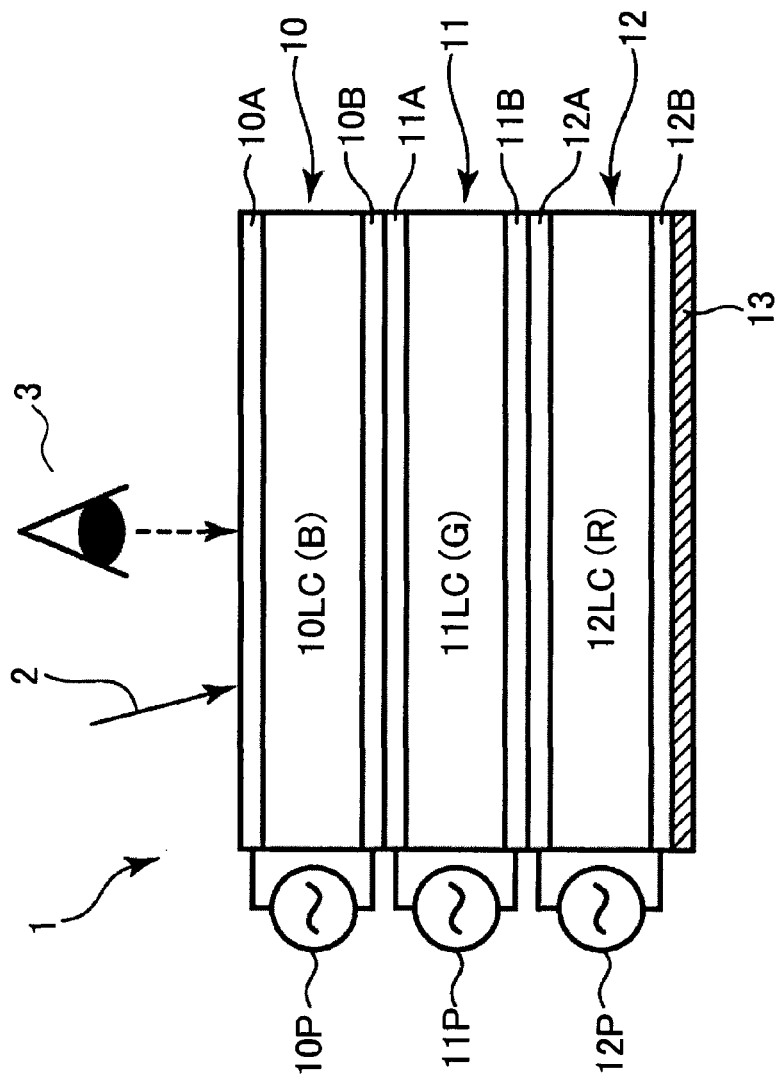
FIG. 1 is a diagram depicting a cross-sectional configuration of an exemplary liquid crystal display device.
Figure 3:
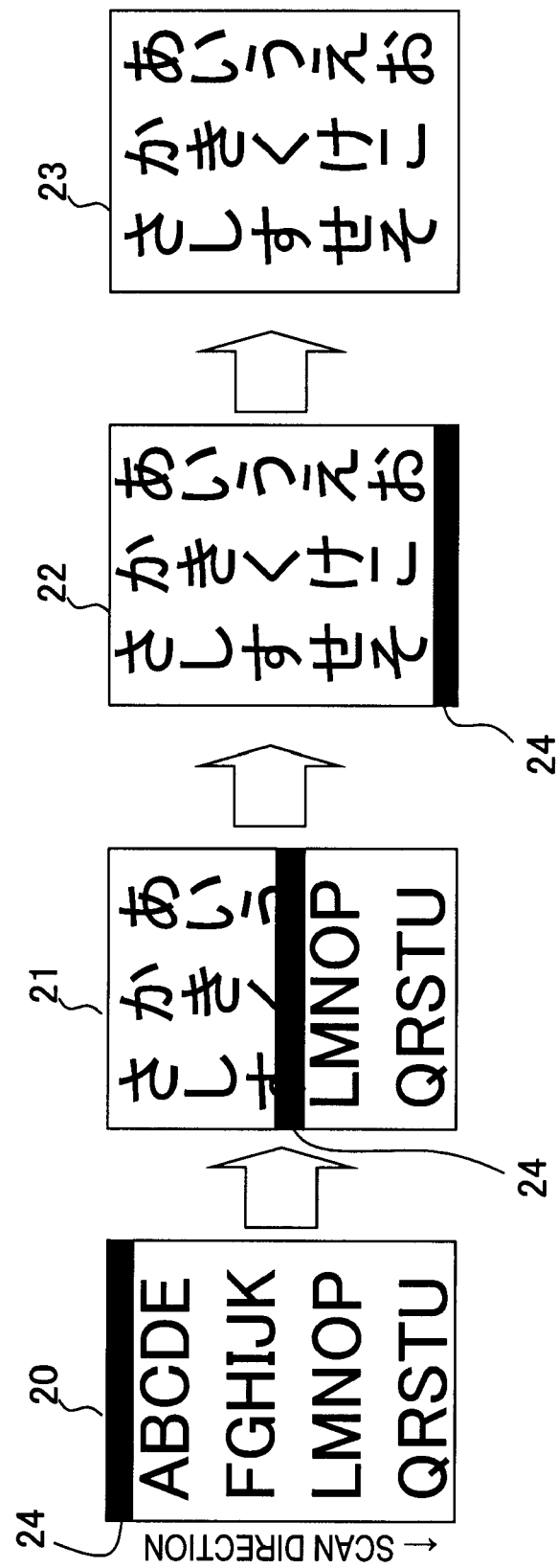
FIG. 3 depicts a problem of a conventional display refreshing method.
Figure 4:
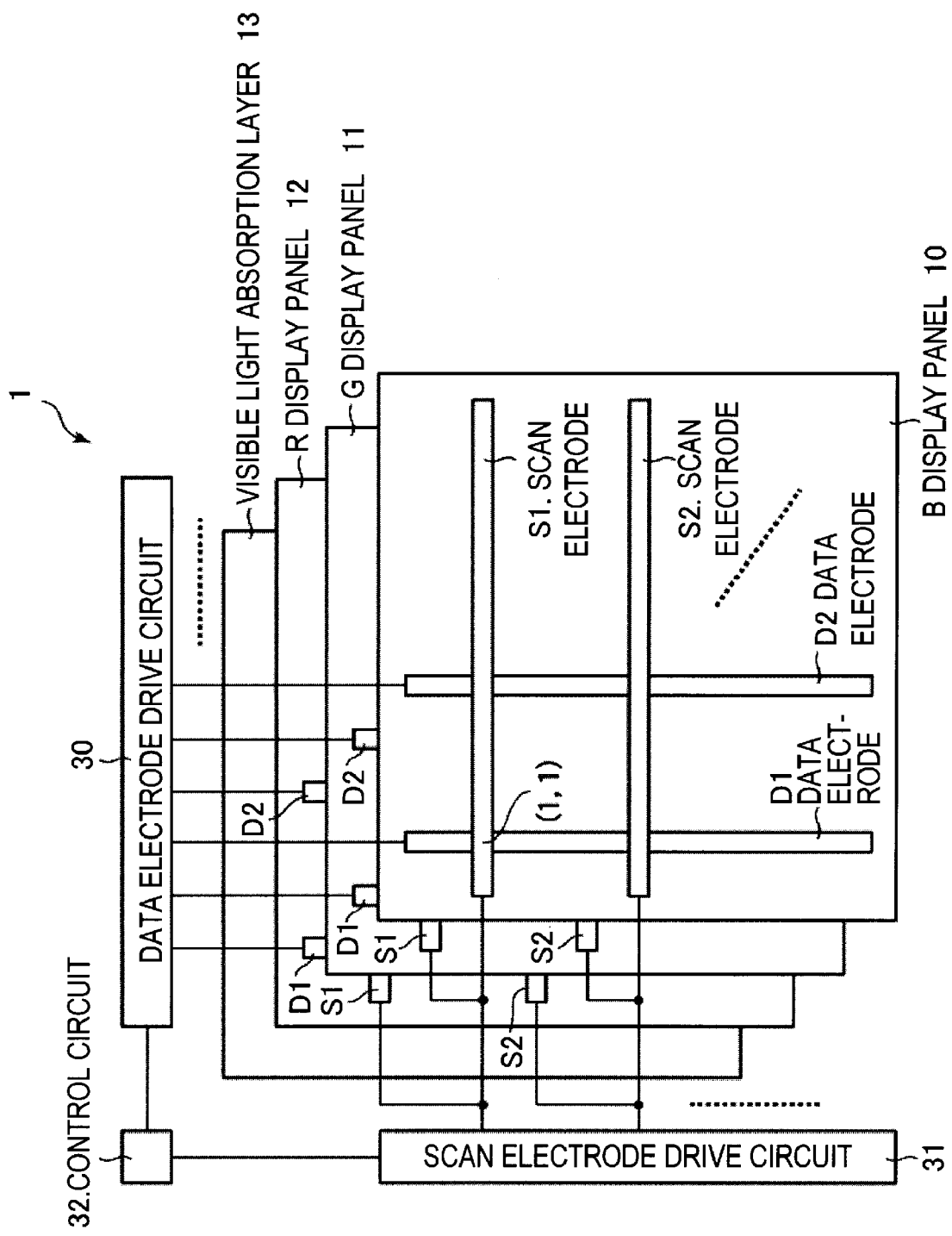
FIG. 4 is a general block diagram depicting a liquid crystal display device according to the present embodiment.
Figure 5:
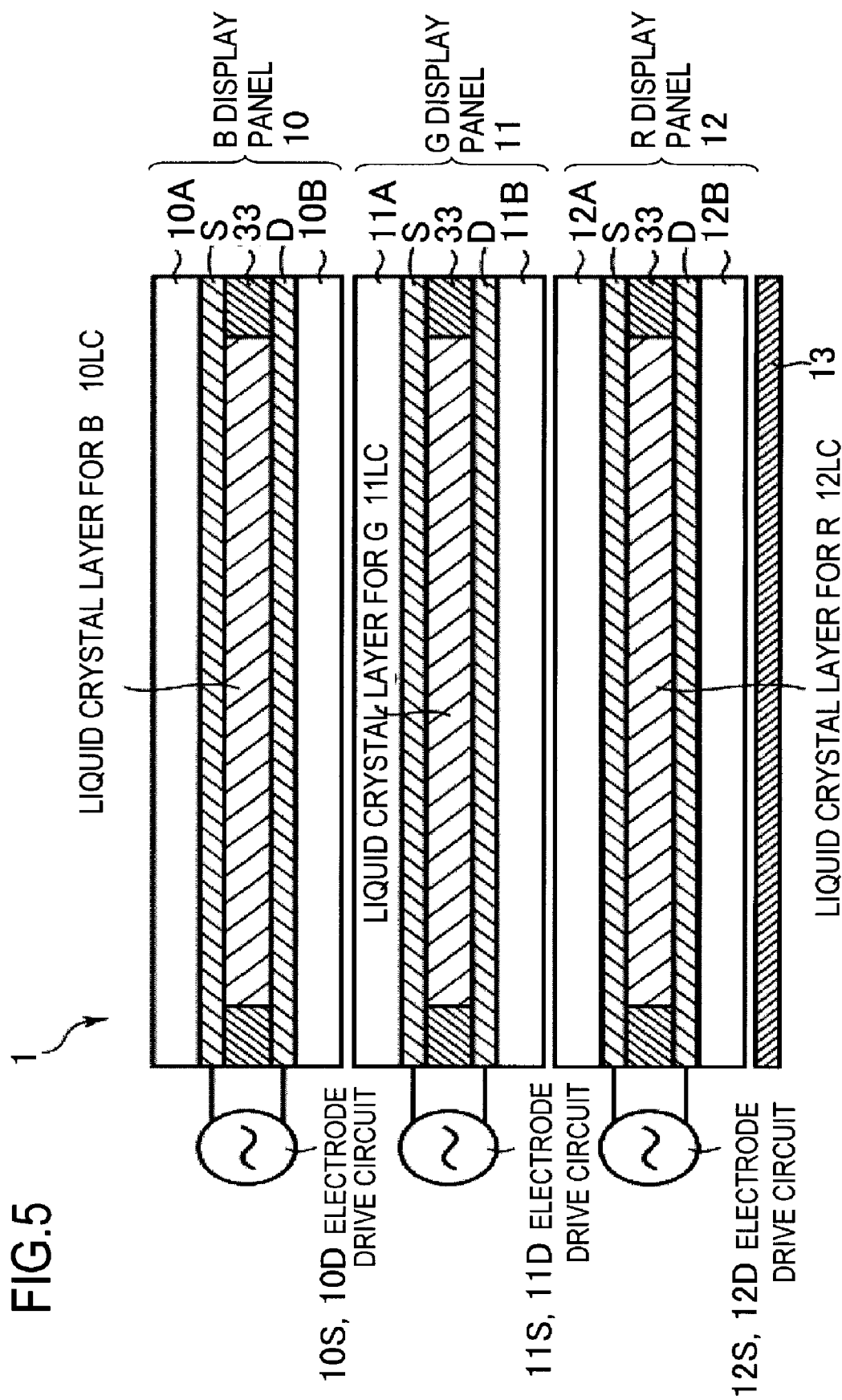
FIG. 5 is a cross-sectional view of a liquid crystal display element according to the present embodiment.

FIG. 4 is a general block diagram depicting a liquid crystal display device according to the present embodiment. FIG. 5 is a cross-sectional view of a liquid crystal display element according to the present embodiment. As FIG. 4 and FIG. 5 depict, the liquid display device 1 has a blue (B) display panel 10 having a B liquid crystal layer 10LC which reflects blue light in the planar state, a green (G) display panel 11 having a G liquid crystal layer 11LC which reflects green light in the planar state, and a red (R) display panel 12 having an R liquid crystal layer 12LC which reflects red light in the planar state. Each B, G and R display panel 10, 11 and 12 is layered in this sequence from the light entering surface (display surface) side.

The B display panel 10 has a pair of top and bottom substrates 10A and 10B which are disposed facing each other, and the B liquid crystal layer 10LC sealed between these substrates. The B liquid crystal layer 10LC has the B cholesteric liquid crystals which are adjusted to selectively reflect blue.

In the same manner, the G display panel 11 and the R display panel 12 have a pair of top and bottom substrates 11A and 11B, and 12A and 12B, which are disposed facing each other respectively, and the G liquid crystal layer 11LC and R liquid crystal layer 12LC sealed between these substrates respectively. The G liquid crystal layer and R liquid crystal layer have G cholesteric liquid crystals and R cholesteric liquid crystals which are adjusted to selectively reflect green and red respectively.

The liquid crystal composition constituting the liquid crystal layer is cholesteric liquid crystals where 10 to 40 wt % chiral material is added to a nematic liquid crystal mixture. This adding quantity of chiral material is a value when the total quantity of the nematic liquid crystal components and chiral material is 100 wt %. For the nematic liquid crystals, various known materials can be used. The refractive index anisotropy ($\Delta n$) is preferably 0.18 to 0.24. The reflectance in the planar state decreases if the refractive index anisotropy is lower than this range, and scattering reflection increases in the focal conic state, and viscosity increases and response speed decreases if the refractive index anisotropy is greater than this range. The thickness of the liquid crystals is preferably 3 to 6 μm, the reflectance in the planar state drops if the thickness is less than this range, and the drive voltage becomes excessively high if the thickness is greater than this range.

Figure 6:
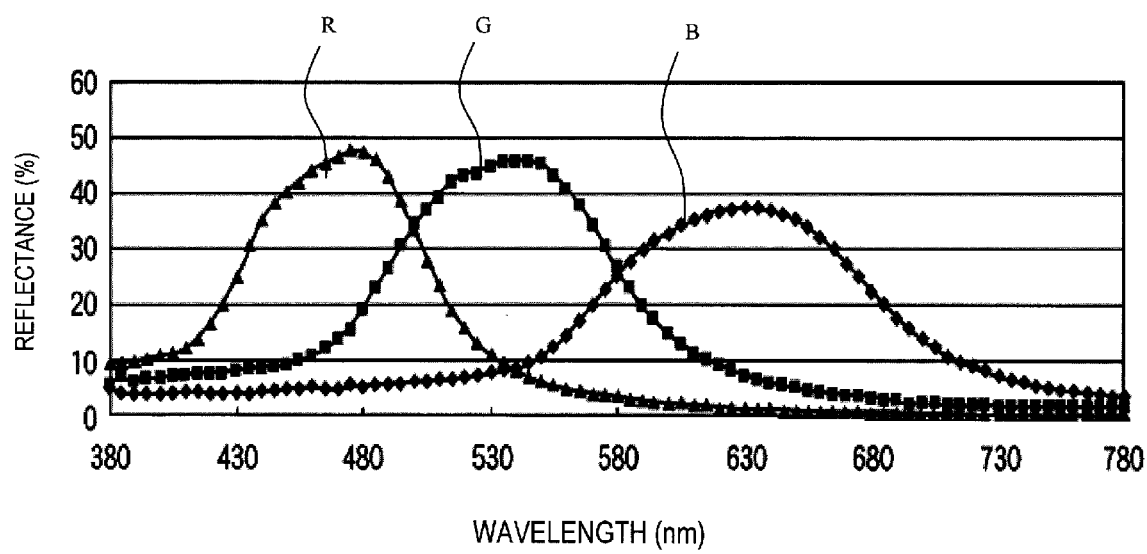
FIG. 6 is a graph depicting the reflection spectrum of red, green and blue.

Now the optical activity of each display panel will be described. FIG. 6 is a graph depicting the reflection spectrum of red, green and blue. In the layered B, G and R display panels 10, 11 and 12, the optical activity in the G liquid crystal layer and the optical activity in the B and R liquid crystal layers in the planar state (reflection state) are differentiated, so in an area where the reflection spectrum of blue (B) and green (G), and that of green (G) and red (R) overlap in FIG. 6, right-handed circularly polarized light is reflected in the B liquid crystal layer and R liquid crystal layer, and left-handed circularly polarized light is reflected in the G liquid crystal layer, for example. Thereby, the loss of reflected light can be reduced and brightness of the display screen of the liquid crystal display device can be improved.

The top substrates 10A, 11A and 12A, and the bottom substrates 10B, 11B and 12B must be translucent. In the case of the present embodiment, two polycarbonate (PC) film substrates, which are cut to size 10 (cm)×8 (cm), are used. Instead of PC film substrates, glass substrates or such film substances as polyethylene terephthalate (PET) may be used. In the present embodiment, both the top substrates and the bottom substrates are translucent, but the bottom substrate 12B of the R display panel, which is disposed in the lowest layer, may be opaque.

As FIG. 4 depicts, a plurality of strip type data electrodes D1 and D2, which extend in the vertical direction, are formed in parallel on the B liquid crystal layer side of the bottom substrate 10B of the B display panel 10. And on the other hand, a plurality of strip type scan electrodes S1 and S2, which extend in the horizontal direction, are formed in parallel on the B liquid crystal layer side of the top substrate 10A. In the case of the present embodiment, transparent electrodes are patterned to be a plurality of scan electrodes and a plurality of data electrodes, in 0.24 mm pitch stripes, so as to implement a 320×240 dots QVGA display.

As FIG. 4 depicts, when the surfaces of the top and bottom substrates, where electrodes are formed, are viewed in a normal line direction, the electrodes D and S face and cross each other. Each crossed area of these electrodes become an individual pixel. A plurality of pixels is arrayed in a matrix and form a display screen.

Typical material of these electrodes is Indium Tin Oxide (ITO), for example, but transparent conductive film such as Indium Zinc Oxide (IZO), metal electrode such as aluminum or silicon, or photoconductive film such as amorphous silicon or Bismuth Silicon Oxide (BSO) may be used instead.

It is preferable that these electrodes are coated with insulation films or orientation films (both not illustrated) for controlling the alignment of liquid crystal molecules as functional films. The insulation film has a function to prevent short circuit of the electrodes and to improve the reliability of the liquid crystal display device as a gas barrier layer. For the orientation film, such organic films as polyimide resin, polyamide imide resin, polyether imide resin, polyvinyl butyral resin and acrylic resin, or such inorganic material as silicon oxide and aluminum oxide, can be used. In the present embodiment, the orientation film is coated onto the entire surface of the substrate which is on the electrodes, for example. The orientation film may also function as an insulation thin film.

As FIG. 5 depicts, the B liquid crystal layer 10LC is sealed between the top and bottom substrates by a seal material 33 coated around the outer edges of the substrates. The thickness (cell gap) of the B liquid crystal layer must be kept uniform. In order to maintain a predetermined cell gap, spherical spacers made of resin or inorganic oxide are spread in the B liquid crystal layer, or a plurality of columnar spacers are formed in the B liquid crystal layer. In the liquid crystal display device of the present embodiment, spacers (not illustrated) are inserted in the B liquid crystal layer so as to maintain uniformity of the cell gaps. The cell gap of the B liquid crystal layer is preferably in the range of $3\ \mu m \leq d \leq 6\ \mu m$.

The G display panel 11 and the R display panel 12 have similar structures as the B display panel 10. A visible light absorption layer 13 is formed on the outer surface (back surface) of the bottom substrate 12B of the R display panel 12 in the bottommost layer. Therefore when all the B, G and R liquid crystal layers 10LC, 11LC and 12LC are in the focal conic state, black is displayed on the display screen of the liquid crystal display. The visible light absorption layer 13 may be formed as needed. If the visible light absorption layer 13 is not formed, images of the reflected lights in the respective colors are formed on the transparent panel.

A scan electrode drive circuit 31 (10S, 11S, 12S), on which scan electrode driver ICs for driving the plurality of scan electrodes are mounted, is disposed on the top substrate. A data electrode drive circuit 30 (10D, 11D, 12D), on which data electrode driver ICs for driving the plurality of data electrodes are mounted, is disposed on the bottom substrate. These drive circuits 30 and 31 output scan signals or data signals to the scan electrodes S1 and S2, or to the data electrodes D1 and D2, based on a predetermined signal which is output from the drive control circuit 32.

Figure 7A:
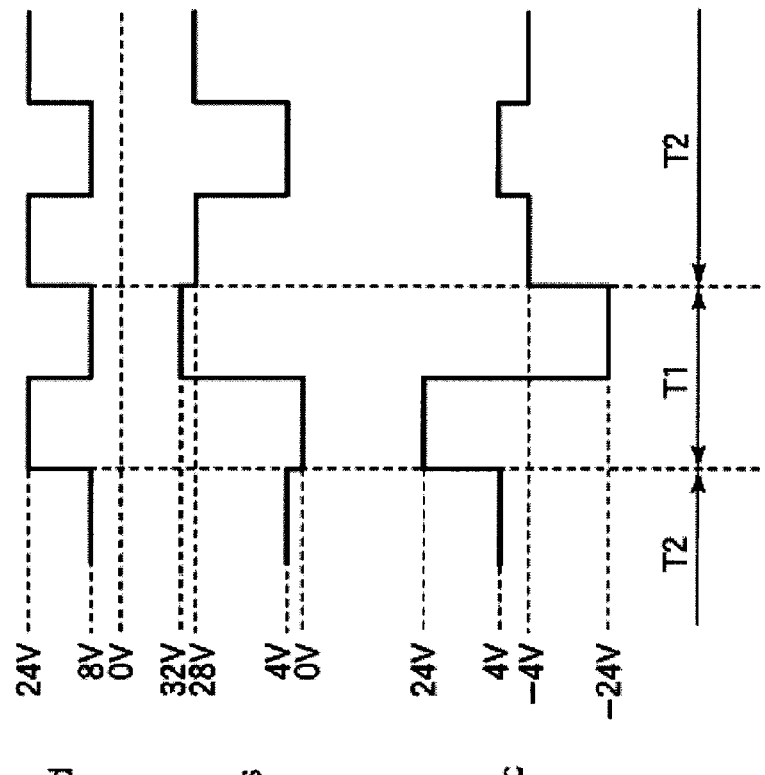
FIG. 7A and FIG. 7B depict examples of drive waveforms of the liquid crystal display device according to the present embodiment.
Figure 7B:
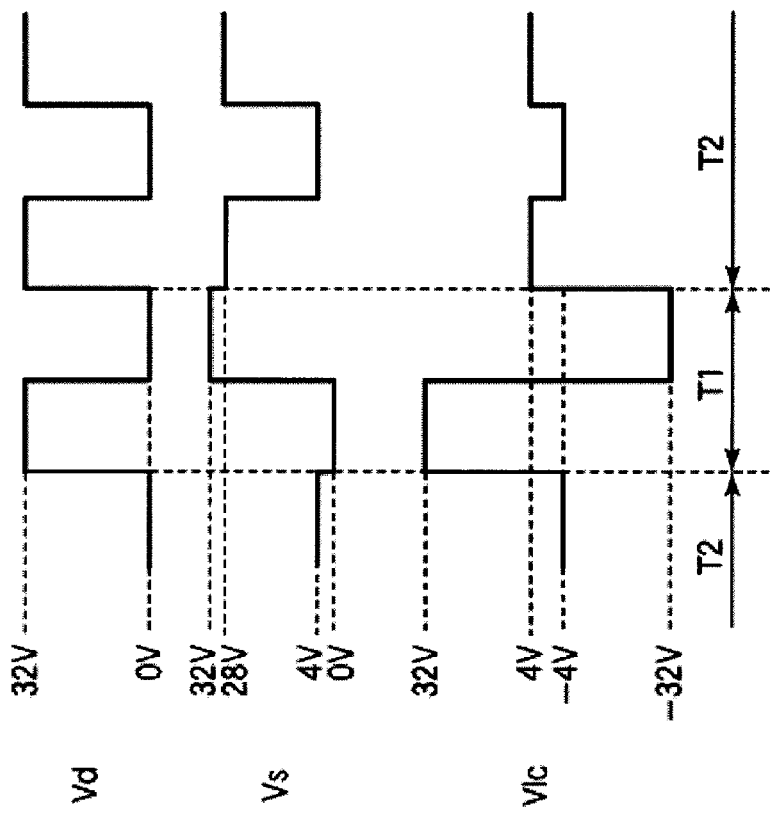
Figure 8:
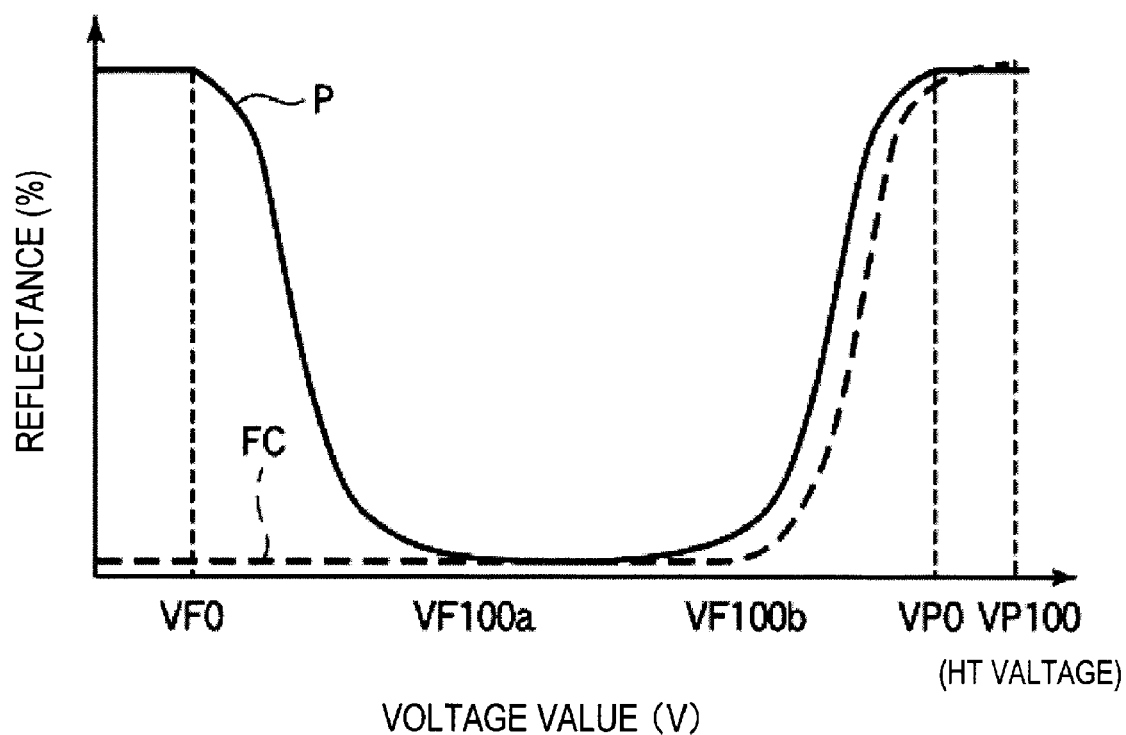
FIG. 8 depicts an example of the voltage-reflectance characteristic of the cholesteric liquid crystals.

FIG. 7A and FIG. 7B depict examples of drive waveforms of the liquid crystal display device according to the present embodiment. FIG. 8 depicts an example of the voltage-reflectance characteristic of the cholesteric liquid crystals. With reference to these figures, an example of a method for driving the liquid crystal display device will be described.

FIG. 7A is a drive waveform to set the cholesteric liquid crystals to the planar state, and FIG. 7B is a drive waveform to set the cholesteric liquid crystals to the focal conic state. FIG. 7A and FIG. 7B depict a voltage waveform Vd of the data signal which is output from the data electrode drive circuit 30, a voltage waveform Vs of the scan signal which is output from the scan electrode drive circuit 31, and an applied voltage waveform Vlc which is applied to each pixel by applying the voltages Vd and Vs. The left to right directions in FIG. 7A and FIG. 7B depict elapse of time, and the vertical direction depicts voltage.

The abscissa in FIG. 8 depicts a voltage value to be applied to the cholesteric liquid crystals, and the ordinate depicts the reflectance (%) of the cholesteric liquid crystals. The curve P of the solid line in FIG. 8 depicts the voltage-reflectance characteristic of the cholesteric liquid crystals when the initial state is the planar state, and the curve FC of the broken line depicts the voltage-reflectance characteristic of the cholesteric liquid crystals when the initial state is the focal conic state.

Here a case when the applied voltage Vlc by the above mentioned data signal Vd and scan signal Vs is applied to the blue (B) pixel (1, 1) at the crossed portion of the data electrode D1 in the first column and the scan electrode S1 of the first row of the B display panel 10 depicted in FIG. 4 will be described as an example.

First writing in the planar state will be described. As FIG. 7A depicts, in about ½ of the first half of the selected period T1, in which the first row of the scan electrode S1 is selected, the data signal Vd becomes +32 V, and the scan signal voltage Vs becomes 0 V, while in about ½ of the latter half period, the data signal voltage Vd becomes 0 V and the scan signal voltage Vs becomes +32 V. As a consequence, ±32 V of pulse voltage is applied to the B liquid crystal layer of the B pixel (1, 1) during the selected period T1, as the applied voltage Vlc depicts.

The applied voltage Vlc applied to liquid crystal layer of a pixel, which is ±32 V, corresponds to the high voltage VP100 in FIG. 8. When a predetermined high voltage VP100 (e.g. 32 V) is applied to the cholesteric liquid crystals and a strong electric field is generated, as depicted in FIG. 8, the spiral structure of the liquid crystal molecules are completed untwisted, and all the liquid crystal molecules align in the direction of the electric field, that is, the homeotropic state. Therefore the liquid crystal molecules in the B liquid crystal layer in the B pixel (1, 1) become the homeotropic state in the selected period T1. This is the reset state.

When the selected period T1 ends and the non-selected period T2 starts in FIG. 7A, +28 V and +4 V scan signal voltages Vs are applied to the scan electrode in the first row in the ½ of the first half and ½ of the latter half period of the non-selected period T2 respectively. A predetermined data signal voltage Vd, on the other hand, is applied to the data electrode D1 in the first column. This data signal voltage Vd is a write voltage to the scan electrode S2 in the second row, and the scan signal voltage Vs of the scan electrode S1, corresponding to the data signal voltage Vd has a same phase as the data signal voltage Vd. As a result, ±4 V of pulse voltage Vlc is applied to the B liquid crystal layer of the B pixel (1, 1) during the non-selected period T2. Thereby the electric field generated in the B liquid crystal layer in the B pixel (1, 1) becomes virtually zero during the non-selected period T2.

When the liquid crystal molecules are in a homeotropic state where the liquid crystal applied voltage Vlc is high voltage VP100 (±32 V) in FIG. 8, if the liquid crystal applied voltage rapidly changes to the low voltage VF0 (±4 V) and the electric field becomes virtually zero, the liquid crystal molecules become a spiral state in which the spiral axis is roughly vertical with respect to both electrodes, and enter the planar state where light is selectively reflected according to the spiral pitch. Therefore the B liquid crystal layer of the B pixel (1, 1) reflects light, and the B pixel (1, 1) displays blue.

Second, write in the focal conic state will be described. As FIG. 7B depicts, the data signal voltage Vd becomes 24 V/8 V and the scan signal voltage Vs becomes 0 V/+32 V in about ½ of the first half and in about ½ of the latter half of the selected period T1. In other words, the scan signal voltage Vs is the same as FIG. 7A, but the data signal voltage Vd is low. As a result, ±24 V of pulse voltage Vlc is applied to the B liquid crystal layer of the B pixel (1, 1). This ±24 V corresponds to the low voltage VF100b in FIG. 8.

If a predetermined low voltage VF100b (e.g. 24 V) is applied to the cholesteric liquid crystals and a weak electric field is generated, as depicted in FIG. 8, the spiral structure of the liquid crystal molecules cannot be completely untwisted.

Then in the non-selected period T2, +28 V/+4 V of the scan signal voltage Vs, for example, is applied to the scan electrode S1 in the first row in the ½ of the selected period T1, and predetermined data signal voltage (e.g. +24 V/8 V) Vd is applied to the data electrode D1 in the ½ of the first half and ½ of the latter half of the selected period T1. The data signal voltage Vd is a voltage for writing the scan electrode S2 in the second row, for example. By applying the above scan signal voltage Vs and data signal voltage Vd, −4 V/+4 V of pulse voltage Vlc is applied to the B liquid crystal layer of the B pixel (1, 1) during the non-selected period T2. Thereby the electric field generated in the B liquid crystal layer of the B pixel (1, 1) becomes virtually zero during the non-selected period T2.

When the spiral structure of the liquid crystal molecules cannot be completely untwisted where the liquid crystal applied voltage Vlc is low voltage VF100b (±24 V) in FIG. 8, if the applied voltage Vlc rapidly changes to VF0 (±4 V) and the electric field becomes virtually zero, the liquid crystal molecules become a spiral state in which the spiral axis is roughly in parallel with both electrodes, and enter a focal conic state where incident light is transmitted. Therefore the B liquid crystal layer of the B pixel (1, 1) transmits light.

As FIG. 8 depicts, the cholesteric liquid crystals can also be aligned to the focal conic state by applying VP100 (V) of voltage to generate a strong electric field in the liquid crystal layer, and then slowly removing the electric field.

The reason why opposite phase pulses are applied between the selected period T1 and non-selected period T2 respectively in FIG. 7A and FIG. 7B, is to prevent deterioration of the liquid crystal layer, and this is a method for driving the liquid crystal layer. In FIG. 7A, even if the data signal voltage Vd becomes +32 V/0 V in the non-selected period T2, the applied voltage Vlc becomes +4 V/−4 V, and the electric field of the pixel becomes virtually zero in the same manner. In FIG. 7B as well, even if the data signal voltage Vd becomes +24 V/8 V in the non-selected period T2, the applied voltage Vlc becomes −4 V/+4 V, and the electric field of the pixel becomes virtually zero in the same manner. In other words, in the non-selected period T2, the phase of the scan signal voltage Vs is set to be the same as the data signal voltage Vd, and the voltage value thereof is set to +28 V/4 V, so that applied voltage Vlc applied to the pixel becomes +4 V, whether the data signal voltage Vd becomes either one of the two possible types of voltages (+32 V/0 V, +24 V/8 V).

For cholesteric liquid crystals to be aligned from the planar state or focal conic state to the homeotropic state (state of VP100 in FIG. 8), high voltage VP100 must be applied during a predetermined period. Hence the state of applied voltage Vlc=±32 V in the selected period T1 in FIG. 7A is maintained for a predetermined period, and is then set to the data signal voltage Vd=+32 V/0 V in the selected period T1 in FIG. 7A or data signal voltage Vd=+24 V/8 V in the selected period T1 in FIG. 7B, depending on the display data, and then is immediately set to the applied voltage Vlc=±4 V in the non-selected period T2. This drive method will be described later.

The above mentioned drive voltage and drive method are an example, and if 30 to 35 V of pulse voltage is applied between the electrodes at room temperature for 20 to 100 ms, the cholesteric liquid crystals in the blue liquid crystal layer become the selected reflection state (planar state), and if 15 to 22 V of pulse voltage is applied for 20 to 100 ms, the cholesteric liquid crystals become a good transmission state (focal conic state) can be created.

By driving a green (G) pixel (1, 1) and a red (R) pixel (1, 1) in the same manner as the above mentioned driving of a blue pixel (1, 1), color display is possible in the pixel (1, 1), where B, G and R pixels (1, 1) are layered. By data scanning, which sequentially drives from the first row to the nth row of scan electrodes, and applies data signal voltage on each data electrode to each line, voltage based on the display data is applied to all the pixels from pixel (1, 1) to pixel (n, m), and one frame (display screen) of color display can be executed.

If an electric field having an intermediate strength is applied to the cholesteric liquid crystals, and this electric field is rapidly removed, an intermediate state, in which the planar state and focal conic state are mixed, is created. By utilizing this, each pixel can be set to a half tone state, and full color display using three liquid crystal display panels can be implemented.

Figure 9:
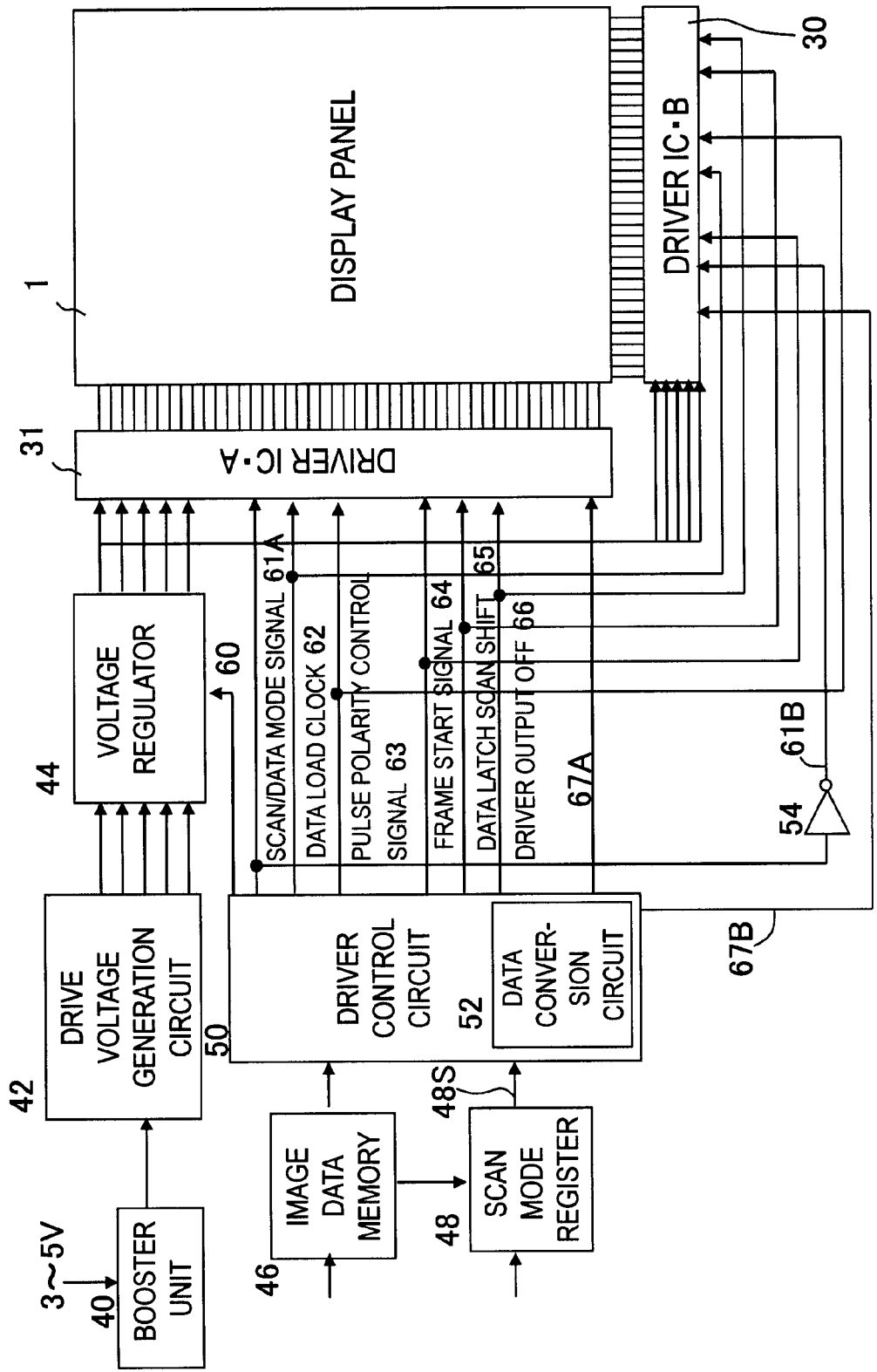
FIG. 9 is a block diagram depicting the display device according to the present embodiment.

FIG. 9 is a block diagram depicting the display device according to the present embodiment. The display panel 1 comprises RGB display panels which are layered, as mentioned above, and a drive circuit 31 for driving the scan electrode group of these display panels and a drive circuit 30 for driving the data electrode group are disposed. These drive circuits 30 and 31 are disposed in the RGB display panels respectively. And drive circuits 30 and 31, however, may be disposed commonly for the three display panels.

The display device has a booster unit 40 for boosting the power supply voltage 3-5V, a drive voltage generation circuit 42 which generates a plurality of voltages from the boosted voltage from the booster unit 40, by dividing resistance, for example, and a voltage regulator 44 which controls the voltage generated by the drive voltage generation circuit 42 to be a constant value, and the plurality of voltages generated by the voltage regulator 44, that is, 32 V, 28 V, 24 V, 8 V, 4 V and 0 V, in the case of the above mentioned example, are supplied to the drive circuits 30 and 31.

The drive circuits 30 and 31 can be switched between scan mode, in which drive circuits 30 and 31 operate as scan electrode drive circuits which generate scan pulse signals Vs synchronizing with the scan timing, and data mode, in which the drive circuits 30 and 31 operate as data electrode drive circuits, which generate data pulse signals Vd according to the write data.

Therefore a drive control circuit 50 for controlling these drive circuits 30 and 31 supplies scan/data mode signals 61A and 61B (inverted by an inverter 54) to the drive circuits 30 and 31, so as to switch between a horizontal scan and vertical scan. In other words, a vertical scan is selected if the scan electrode drive circuit 31 is controlled to be scan mode and the data electrode drive circuit 30 is controlled to be the data mode, and a horizontal scan is selected if the scan electrode drive circuit 31 is controlled to be the data mode and the data electrode drive circuit 30 is controlled to be the scan mode. Corresponding to this mode signal 61, the driver control circuit 50 supplies to the voltage regulator 44 a voltage switching signal 60 for controlling switching of the output voltage of the voltage regulator 44. This voltage switching signal will be described later.

The driver control circuit 50 supplies not only the above mentioned mode signal 61, but also a data load clock 62 to indicate a write data load timing, a pulse polarity control signal 63 to instruct the inversion/non-inversion of the drive pulse, a frame start signal 64 to indicate the start of refresh control, a data latch/scan shift signal 65 to control the shift timing of scanning, and a driver output OFF signal 66 to turn the driver output OFF, to the drive circuits 30 and 31. The driver control circuit 50 supplies scan switching signals 67A and 67B for controlling the scan direction, such as the forward direction, backward direction, or forward direction or backward direction from the center, to the drive circuits 30 and 31 respectively. By this scan switching signal, the scan mode in the strip area, based on the reset driving, is controlled to be a desired mode.

In an image data memory 46, one frame of image data, for example, is stored. A data conversion circuit 52 in the driver control circuit 50 reads image data for each pixel from the image data memory 46, and converts it into drive image data to be supplied to the drive circuit 30 or 31 controlled to be the data mode. The drive circuits 30 and 31 in the data mode drive the electrodes according to this drive image data.

A scan mode register 48 stores a scan mode signal according to a setup signal from the outside by the user, and supplies the scan mode signal 48S to the driver control circuit 50. The driver control circuit 50 generates the voltage switching signal 60, scan/data mode signals 61A and 61B, frame start signal 64 and scan switching signals 67A and 67B, according to this scan mode signal 48S.

The above scan mode includes various modes, such as (1) horizontal scan, (2) vertical scan, (3) a different scan direction for each display panel, (4) a different scan timing (start timing) for each display panel, (5) forward scan from the center, and (6) backward scan from the center.

Figure 10:
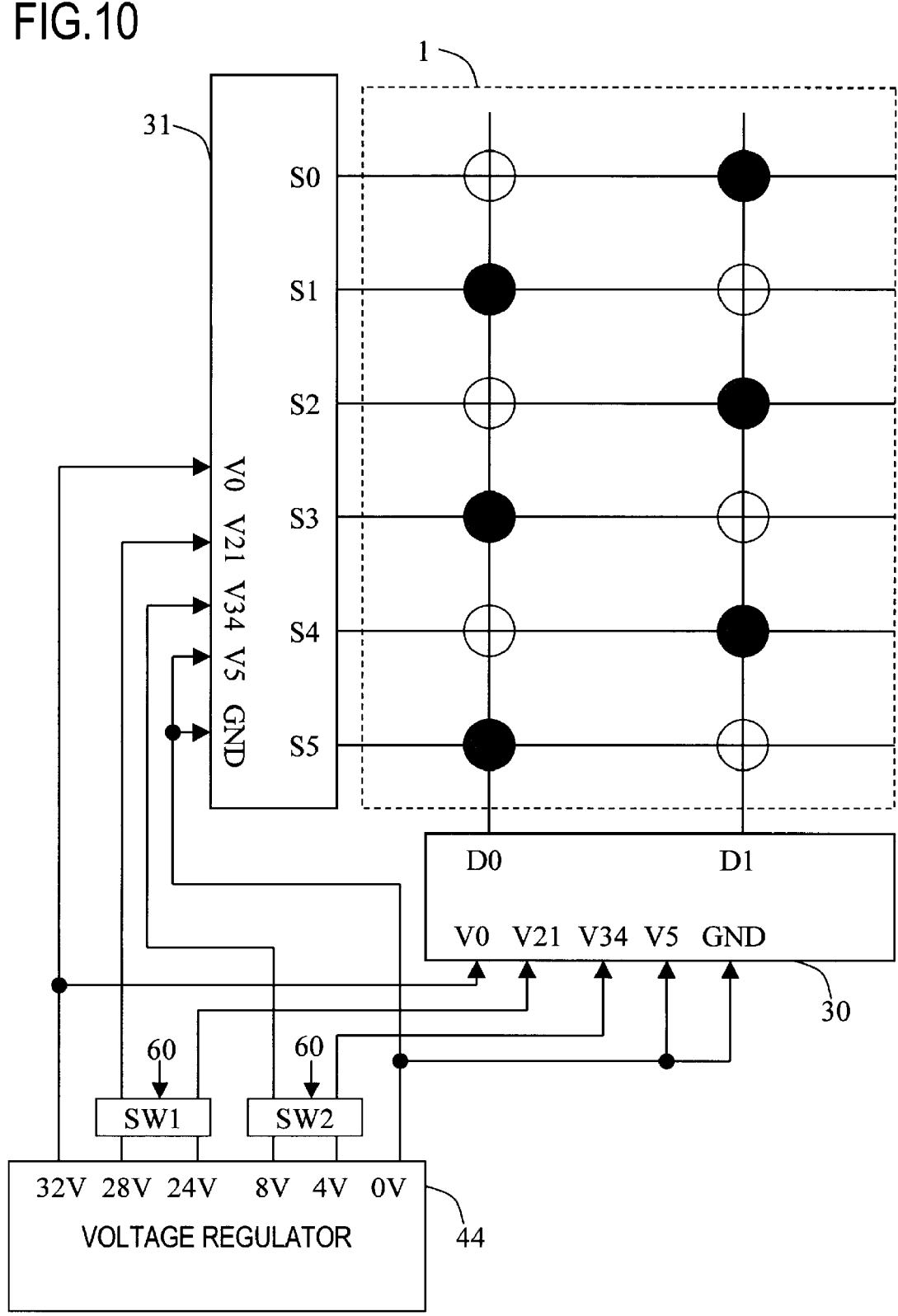
FIG. 10 is a diagram depicting a relationship between the voltage regulator and drive circuit according to the present embodiment.

FIG. 10 is a diagram depicting a relationship between the voltage regulator and drive circuit according to the present embodiment. As described in FIG. 9, the driver control circuit 50 supplies the voltage switching signal 60 to the voltage regulator 44 so as to switch the output voltage of the voltage regulator 44. As FIG. 10 depicts, the voltage regulator 44 generates six types of voltages, that is, 32 V, 38 V, 24 V, 8 V, 4 V and 0 V. The drive circuits 30 and 31 have input voltage terminals V0, V21, V34, V5 and GND, and to this input voltage terminal group, either a combination of 32 V, 28 V, 8 V, 0 V and 0 V or a combination of 32 V, 26 V, 4 V, 0 V and 0 V must be input depending on whether the selected mode is the data mode or the scan mode. Therefore the switches SW1 and SW2 are switched by the voltage switching signal 60 depending on whether the drive circuits 30 and 31 are in data mode or scan mode.

FIG. 11A and FIG. 11B depict the relationship of the input voltage terminals of the drive circuits 30 and 31 and the input voltage in scan mode and data mode. In the scan mode in FIG. 11(A) and data mode in FIG. 11(B), the values of voltage to be input to the input voltage terminals V21 and V34 are different. In other words, switches SW1 and SW2 are switched by the voltage switching signal 60 so that in the drive circuit in the scan mode, 28 V is input to the input voltage terminal V21 and 4 V is input to V34, and in the drive circuit in the data mode, 24 V is input to the input voltage terminal V21 and 8 V is input to V34.

FIG. 12 depicts the voltage values of pulse signals in the drive circuits 30 and 31 in the scan mode and data mode. In FIG. 12, a combination of voltages of the data pulse signal Vd and the scan pulse signal Vs depicted in FIG. 7A and FIG. 7B is depicted corresponding to the data mode and scan mode. In other words, the drive circuits 30 and 31 are constructed so as to generate the pulse signal having the input voltage of the input voltage terminal, which is depicted in the column of the driver output in FIG. 12. Therefore the drive circuits 30 and 31 can be operated in the data mode or scan mode if the input voltage in FIG. 11A and FIG. 11B can be supplied to the input voltage terminal group corresponding to the data mode and scan mode.

Figure 13A:
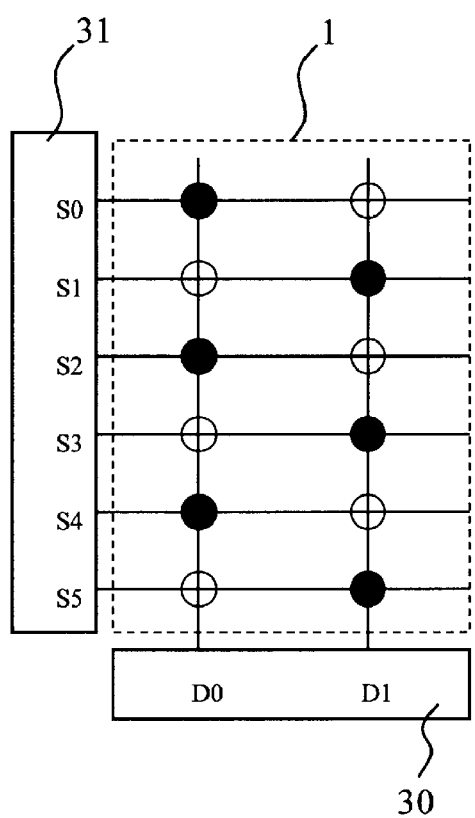
FIG. 13 depicts an example of refreshing image according to the embodiment.
Figure 13B:
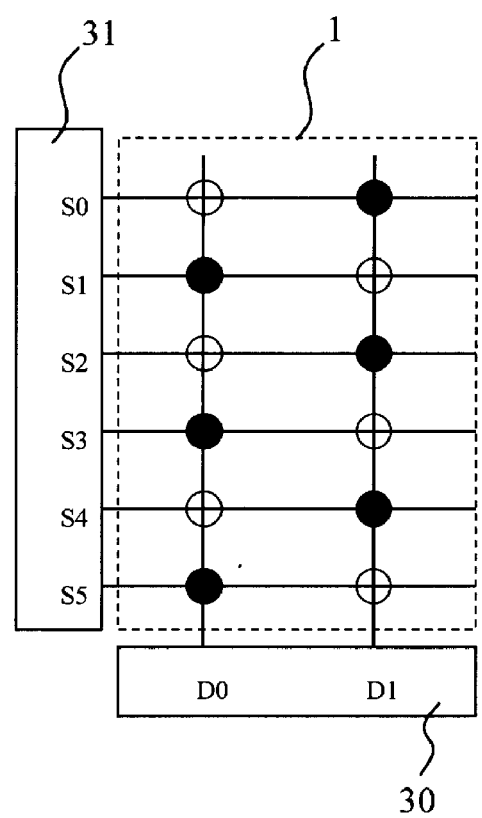
Figure 14:
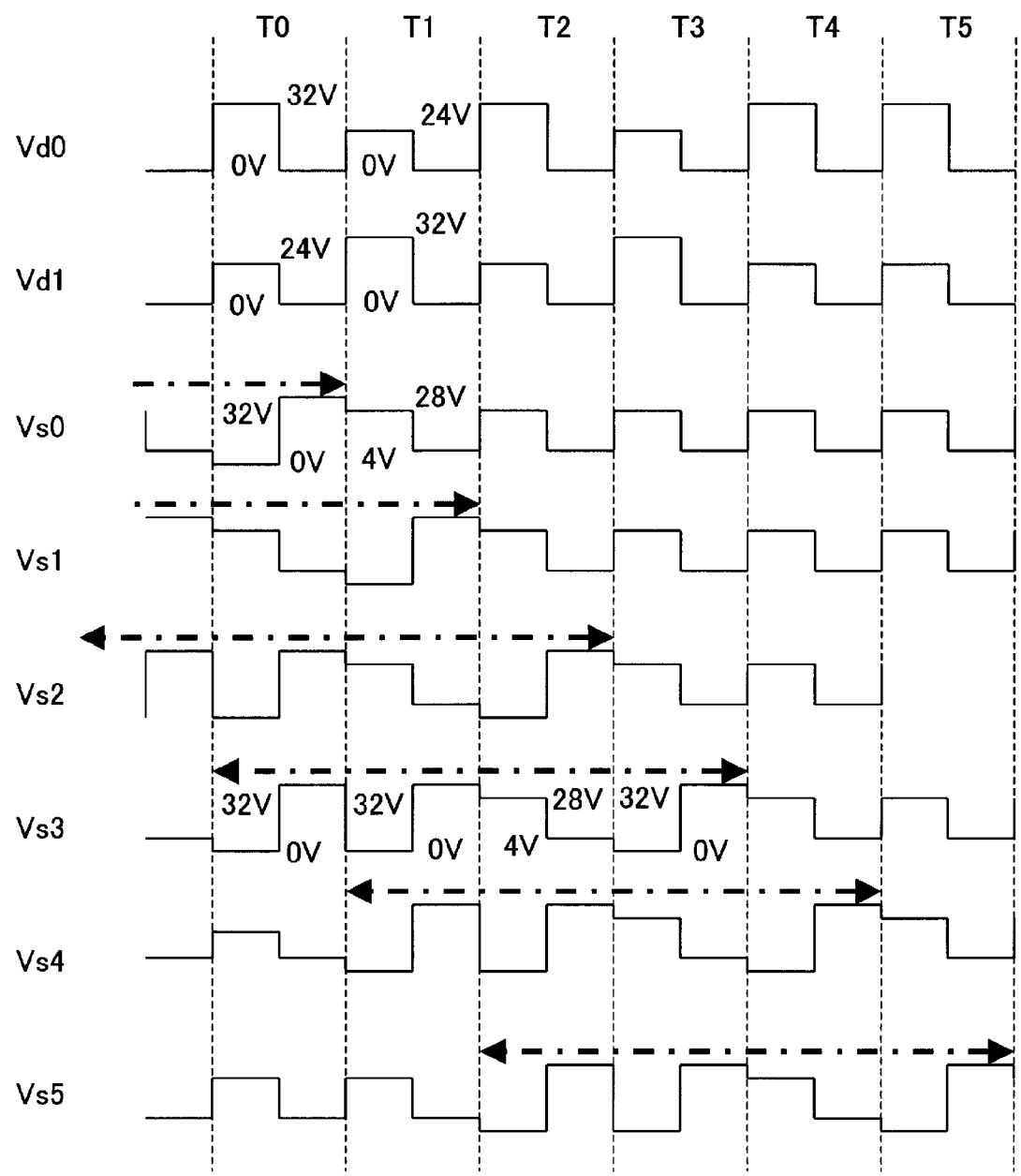
FIG. 14 depicts an example of refreshing image according to the embodiment.
Figure 15:
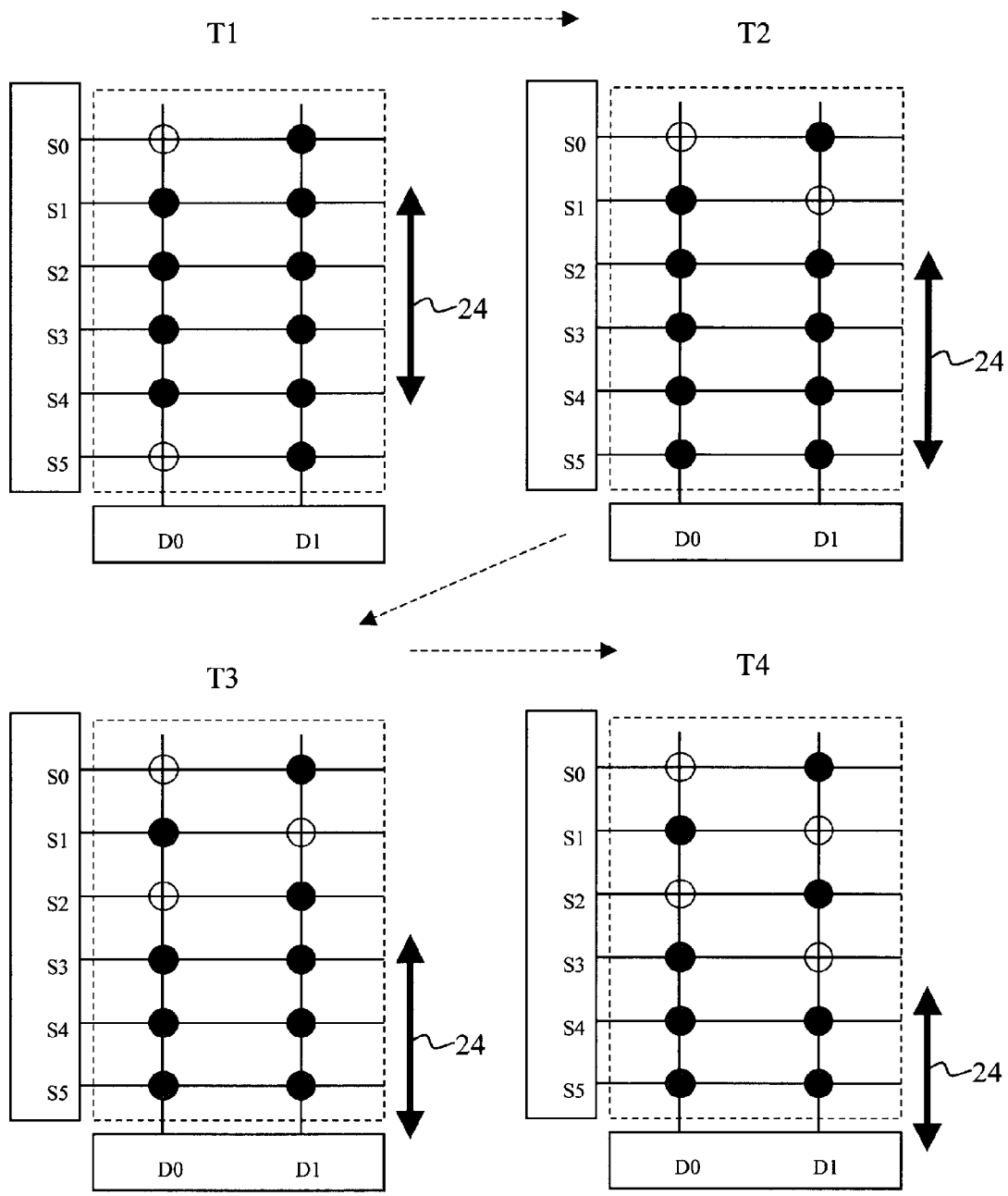
FIG. 15 depicts an example of refreshing image according to the embodiment.

FIGS. 13, 14 and 15 are diagrams depicting examples of a refresh method according to the present embodiment. The image on the display panel is refreshed by combining the above mentioned basic pulse signals in FIG. 8 and FIG. 9.

In FIG. 13A and FIG. 13B, the display panel 1 has scan electrodes S0 to S5 and data electrodes D0 and D1, for example, and the respective electrodes are driven by the drive circuits 30 and 31. A case of refreshing the display image in FIG. 13A into the display image in FIG. 13B will be described. Here a black dot indicates a focal conic state, a white circle indicates a planar state, and refreshing to a black and white image, without including half tones, will be described.

FIG. 14 depicts an example of data pulse signals Vd0 and Vd1, and scan pulse signals Vs0 to Vs5. In FIG. 14, pulse signals with scan cycles T0 to T5 are depicted. The data pulse signals Vd0 and Vd1 has 32 V/0 V (planar state) or 24 V/0 V (focal conic state) of data pulse signals depending on the write image. The scan pulse signals Vs0 to Vs5 have a selected pulse for 0 V/32 V of reset or write, which is applied during the selected period T1 in FIG. 7, and a 28 V/4 V of non-selected pulse applied during the non-selected period T2 in FIG. 7.

In each scan pulse signal Vs0 to Vs5, the period indicated by the dash and dotted line is the reset and write scan period consisting of four scan cycles. In the case of the scan electrode S3, for example, the scan pulse signal Vs3 becomes the selected pulse (0 V/32 V) at scan cycles T0 and T1, and becomes the non-selected pulse (28 V/4 V) at scan cycle T2, and becomes the selected pulse (0 V/32 V) in the last scan cycle T3. In the last scan cycle T3, the data pulse signals Vd0 and Vd1 become 24 V/0 V (focal conic state) and 32 V/0 V (planar sate) respectively corresponding to the write image. The data pulse signals Vd0 and Vd1 in the scan cycles T0, T1 and T2 become pulses corresponding to the write image of the scan electrodes S0, S1 and S2 respectively.

Out of the four scan cycles of a scan period indicated by dash and dotted arrow, the high voltage VP100 or low voltage VF100b in FIG. 8 are applied to two pixels of the scan electrode S3 in the first two scan cycles T0 and T1, and a homeotropic state or state close to this is generated, and in the next scan cycle T2, a virtual zero voltage is applied and two pixels becomes transit state, and in the last scan cycle T3, a high voltage VP100 or low voltage VF100b corresponding to the write image data is applied to the two pixels, and in the scan cycle T4, the pixel which became virtually zero voltage and to which high voltage VP100 is applied becomes planar state (white), and the pixel to which low voltage VF100b is applied becomes focal conic state (black). During the four scan cycles indicated by dash and dotted arrow, the pixel becomes a black strip display.

FIG. 15 shows the states of the display panel in scan cycles T1, T2, T3 and T4 when the pulse signals in FIG. 14 are applied. In the scan cycle T1, the scan electrodes S1 to S4 are in the reset or write scan period, and in the next scan cycle T2, write of scan electrode S1 completes and the scan electrodes S2 to S5 enter the reset and write scan period. In other words, four adjacent scan electrode groups, during reset and during write scan periods, are sequentially shifted down. In the same manner, in the scan cycle T3, write of the scan electrode S2 completes and scan electrodes S3 to S6 enter the reset and write scan period, and in the scan cycle T4, write of the scan electrode S3 completes and scan electrodes S4 to S7 enter the reset and write scan period. As FIG. 15 shows, the black strip area 24 sequentially shifts down in each scan cycle T1 to T4.

According to the image refreshing method depicted in FIG. 14, reset driving and black and white write driving are performed for an electrode group comprised of an adjacent plurality of scan electrodes, and this electrode group is sequentially shifted. Thereby an instantaneous current value can be decreased compared with the case of driving all the pixels of the display panel for reset, and an image can be refreshed by one scan since reset driving and write driving are combined, and therefore refreshing speed can be increased.

In FIG. 14, reset driving with decreased instantaneous current value can be implemented as well by shifting the electrode group while executing only reset driving for the electrode group. In this case, scanning is required again for write driving, after reset driving.

Figure 16:
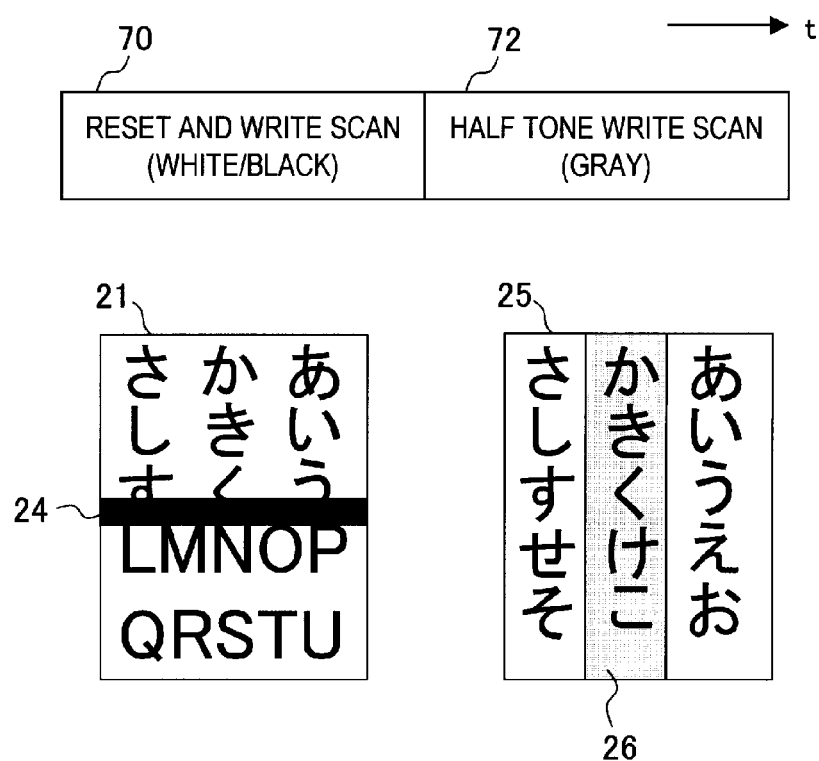
FIG. 16 is a diagram depicting an image refreshing method for generating a half tone image.

FIG. 16 is a diagram depicting an image refreshing method for generating a half tone image. In this example, the reset and write scans 70 depicted in FIG. 14 and FIG. 15 are executed according to time t in the abscissa, and then the half tone write scan 72 is executed. As mentioned above, in the reset and write scan 70, black and white write driving is executed while resetting the pixels of the scan electrode group. So when the strip area 24 passes, the image 21 is refreshed from "A B C D" to "a i u e o in Japanese". Furthermore, in the half tone write scan 72, a voltage corresponding to a grayscale value between the applied voltages VF0 and VF100a in FIG. 8 is applied to the pixels while scanning the scan electrodes, so as to refresh the pixels in the planar state (white) to a desired half tone state. In the case of the example in FIG. 16, the gray area 26 of the image 25 is written.

Figure 17:
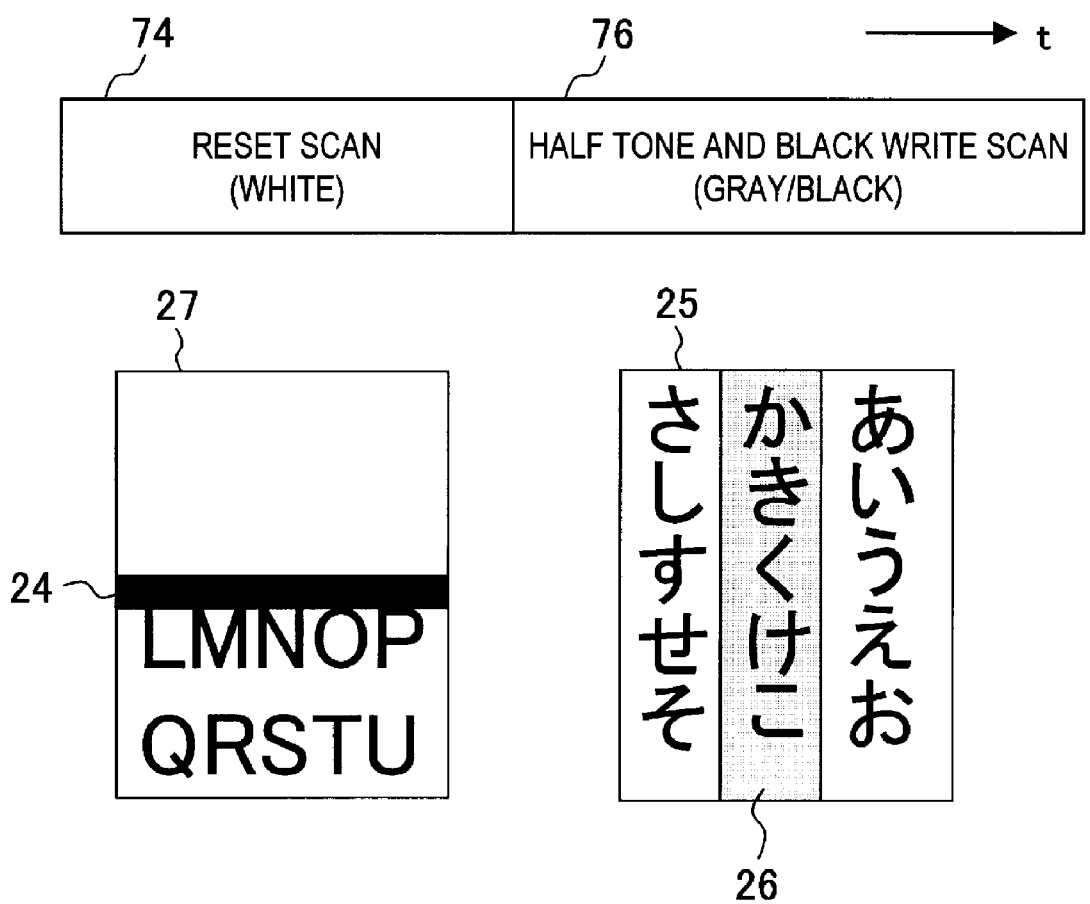
FIG. 17 is a diagram depicting another image refreshing method for generating a half tone image.

FIG. 17 is a diagram depicting another image refreshing method for generating a half tone image. In this example, scan 74 for the reset driving depicted in FIG. 14 is executed according to the time t in the abscissa, then the half tone and black write scan 76 is performed. In the reset scan 74 only reset driving for the scan cycles T0 and T1 is sequentially performed in the scan electrodes S3 in FIG. 14. Therefore the pixels during the reset driving are observed as the strip area 24, and after the strip area 24 passes, the display image 27 becomes all white. According to this reset method, the instantaneous current value can be decreased. Then in the half tone write scan 76, a voltage corresponding to a grayscale value between the applied voltages VF0 and VF100a in FIG. 8 is applied to the pixels while scanning the scan electrodes, so as to refresh the pixels in the planar state (white) to a desired half tone state or black state (focal conic state). In the example in FIG. 17, the black characters of the image 25 and the gray area 26 are written.

In both of the write methods in FIG. 16 and FIG. 17, the user recognizes the movement of the black strip area 24 on the screen by the reset and black and white scan, or by the reset scan. This movement of the strip area 24 is an irritation for the user, therefore in the present embodiment, the scan mode of the strip area 24, such as the scan direction and scan timing, is changed to a desired mode.

Figure 18A:
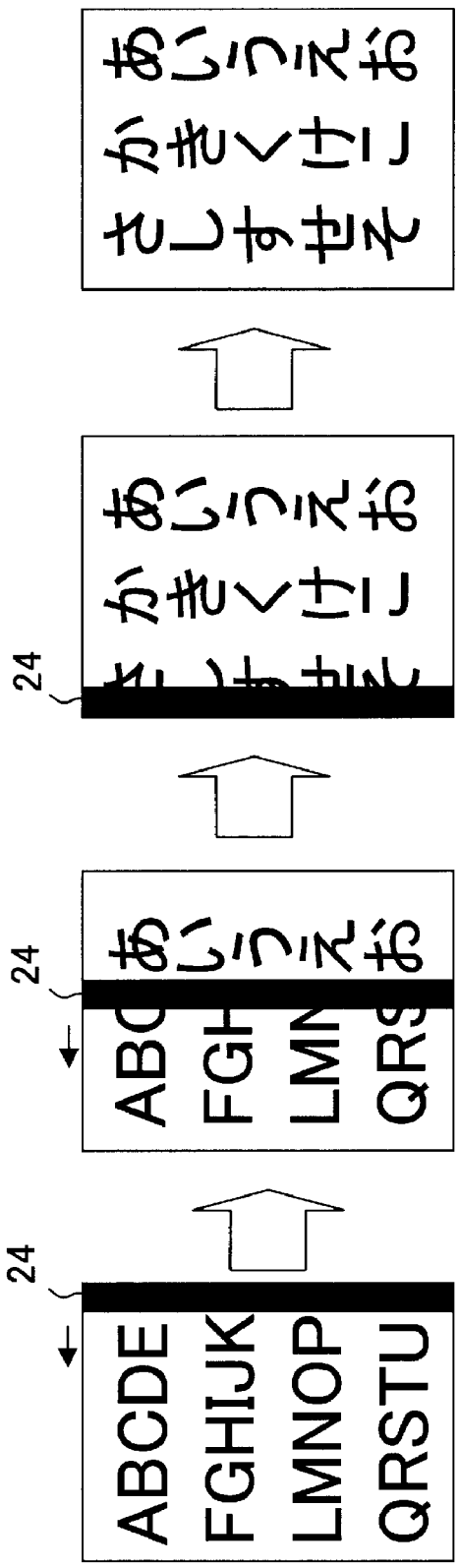
FIG. 18A and FIG. 18B depict scan mode examples of the write method according to the present embodiment.
Figure 18B:
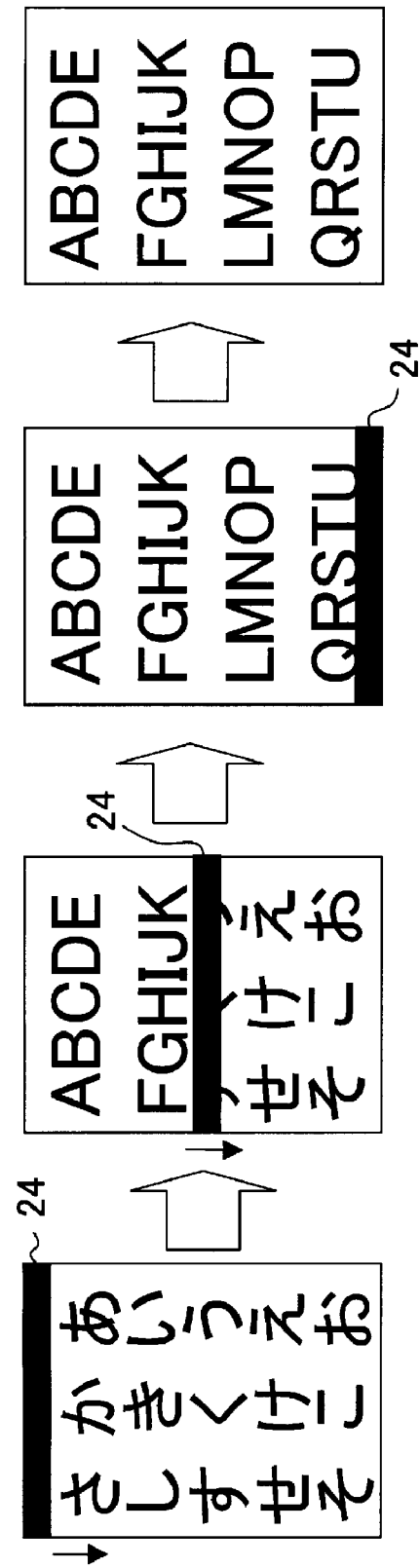

FIG. 18A and FIG. 18B show scan mode examples of the write method according to the present embodiment. This write method is an example of executing a reset and refresh scan on a plurality of scan electrodes depicted in FIG. 14.

FIG. 18A is an example of refreshing the horizontal "A B C D" image and the vertical "a i u e o in Japanese" image. Since the image after refresh is vertical, the reset and refresh scan direction is horizontal in the right to left direction. In other words, the vertical strip area 24 moves from the right edge to the left edge, so refresh to the vertical image can be optimized. Therefore in this case, the driver control circuit 50 in FIG. 9 sets the drive circuit 31 to the data mode and the drive circuit 30 to the scan mode, and sets the scan switching signal 67B to the drive circuit 30, to the right to left mode.

FIG. 18B, on the other hand, is an example of refreshing the vertical "a i u e o in Japanese" image to the horizontal "A B C D" image. Since the image after refresh is horizontal, the reset and refresh scan direction is vertical in the top to bottom direction. In other words, the vertical strip area 24 moves from the top edge to the bottom edge, so refresh to the horizontal image can be optimized. In this case, the driver control circuit 50 in FIG. 9 sets the drive circuit 30 to the data mode, and the drive circuit 31 to the scan mode, and sets the scan switching signal 67A to the drive circuit 31, to the top to bottom mode.

FIGS. 19A to 19D show other scan mode examples of the write method according to the present embodiment. In FIGS. 19A to 19D, there are four types of directions of reset and refresh scan 70 or reset scan 74. In FIG. 19A, the scan direction is from the right edge to the left edge, and the strip area 24 moves from right to left. In FIG. 19B, the scan direction is from the left edge to the right edge, and the strip area 24 moves from left to right. In FIG. 19C, the scan direction is from the top edge to the bottom edge, and the strip area 24 moves from top to bottom. In FIG. 19D, the scan direction is from the bottom edge to the top edge, and the strip area 24 moves from bottom to top. In the above cases as well, the driver control circuit 50 in FIG. 9 sets the drive circuits 30 and 31 to the data mode or scan mode, and sets the scan switching signals 67A and 67B to the drive circuit in the scan mode to a corresponding scan mode.

A scan in which the strip area 24 moves from the center to left and returns to the center from the right edge, or moves from the center to right and returns to the center from the left edge, or moves from the center to the left edge and moves again from the center to the right edge, or moves from the center to the right edge and moves again from the center to the left edge, may also be used. In the present embodiment, one of these scan modes can be set or randomly selected.

FIGS. 20A to 20C show other scan mode examples of the write method according to the present embodiment. These are an example when the respective scan directions and scan timings of the R, G and B display panels are all the same, and examples when they are different from each other. FIG. 20A is an example when all the strip area 24R, 24G and 24B of the R, G and B display panels move from the left edge to the right edge. FIG. 20B is an example when the strip area 24R of the R display panel moves from the top edge to the bottom edge, the strip area 24B of the B display panel moves from the left edge to the right edge, and the strip area 24G of the G display panel moves from the mid-area to the right edge. FIG. 20C is an example when the strip area 24R of the R display panel moves from the top edge to the bottom edge, the strip area 24B of the B display panel moves from the left edge to the right edge, and the strip area 24G of the G display panel moves from the bottom edge to the top edge.

All of these scan modes can be implemented by the driver control circuit 50 changing the above mentioned control signals and the drive circuits 30 and 31 performing variable control of the drive mode.

As described above, in the case of the liquid crystal display device in the above embodiment, the scan state in the black strip area is displayed when refreshing the image, but the scan mode (scan direction, scan timing) can be changed in various ways, and irritation to the user when refreshing the image can be decreased.

The present invention can be applied to not only liquid crystal display devices using cholesteric liquid crystals, but also to display devices using electronic powder and granular material and electrophoresis display materials. In the case of using electronic powder and granular materials and electrophoresis display materials, lights with a predetermined wavelength are reflected (scattered) or absorbed. Therefore the display panel is normally constructed with only one layer, and the light absorption layer is not required. The present invention can be applied to such display devices as well.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

The invention claimed is:

1. A display device, comprising:
a display panel having a first substrate in which a plurality of first electrodes are disposed in parallel, a second substrate in which a plurality of second electrodes crossing the first electrodes so as to form pixels are disposed in parallel, and a material layer which is disposed between the first and second substrates and reflects or transmits light with a predetermined wavelength according to a write state;
first and second drive circuits which drive the first and second electrodes respectively; and
a drive control circuit which performs drive control for the first and second drive circuits,
wherein when refreshing a display image, the first or second drive circuit, while applying a reset pulse to a plurality of adjacent electrode group of first or second electrodes, scans the electrode group so as to reset the pixels in the electrode group,
a plurality of the display panels for which the lights with predetermined wavelengths are all different are layered, and the reflective layer is disposed on the second substrate side of the lowest panel of the plurality of display panels,
the drive control circuit of the plurality of display panels controls the first or second drive circuit, so that the scan direction of the electrode group in the first display panel and the scan direction of the electrode group in the second display panel are different, and
the drive control circuit randomly switches the direction of scanning of the electrode group by the first or second drive circuit.

2. A display device, comprising:
a display panel having a first substrate in which a plurality of first electrodes are disposed in parallel, a second substrate in which a plurality of second electrodes crossing the first electrodes so as to form pixels are disposed in parallel, and a material layer which is disposed between the first and second substrates and reflects or transmits light with a predetermined wavelength according to a write state;
first and second drive circuits which drive the first and second electrodes respectively; and
a drive control circuit which performs drive control for the first and second drive circuits,
wherein when refreshing a display image, the first or second drive circuit, while applying a reset pulse to a plurality of adjacent electrode group of first or second electrodes, scans the electrode group so as to reset the pixels in the plurality of electrode groups,
a plurality of the display panels for which the lights with predetermined wavelengths are all different are layered, and the reflective layer is disposed on the second substrate side of the lowest panel of the plurality of display panels, and
the drive control circuits of the plurality of display panels control the first or second drive circuit, so that the scan timing of the electrode group in the first display panel and the scan timing of the electrode group in the second display panel are different.

3. The display device according to claim 2, wherein the drive control circuit switches the direction of scanning of the electrode group by the first or second drive circuit, according to the attribute of the display image.

4. The display device according to claim 3, wherein the drive control circuit controls the scan direction of the electrode group to be horizontal when characters of the display image after refresh are written vertically, and the scan direction of the electrode group to be vertical when the characters of the display image after refresh are written horizontally.

5. The display device according to claim 1 or claim 2, wherein
the drive control circuit switches the direction of scanning or timing of scanning of the electrode group by the first or second drive circuit according to a set value which is set by a user.

6. The display device according to claim 2, wherein the drive control circuit randomly switches the timing of scanning of the electrode group by the first or second drive circuit.

7. The display device according to claim 1 or claim 2, wherein
the drive control circuit has a data conversion circuit which converts display image data of each pixel into drive image data according to the scan direction.

8. The display device according to claim 1, wherein the plurality of display panels includes a first primary color display panel, a second primary color display panel and a third primary color display panel.

9. The display device according to claim 1 or claim 2, wherein
the material layer is either one of cholesteric liquid crystals, chiral nematic liquid crystals, electronic powder and granular display material, and electrophoresis display material.

* * * * *